US008265989B2

(12) United States Patent
Dodge et al.

(10) Patent No.: US 8,265,989 B2
(45) Date of Patent: Sep. 11, 2012

(54) METHODS AND APPARATUS TO DETERMINE EFFECTS OF PROMOTIONAL ACTIVITY ON SALES

(75) Inventors: James Dodge, Orland Park, IL (US); John Donmyer, Lake Zurich, IL (US); Frank J. Slavik, Plymouth, MN (US)

(73) Assignee: The Nielsen Company, LLC, Schaumburg, IL (US)

( * ) Notice: Subject to any disclaimer, the term of this patent is extended or adjusted under 35 U.S.C. 154(b) by 654 days.

(21) Appl. No.: 12/435,874

(22) Filed: May 5, 2009

(65) Prior Publication Data

US 2010/0287029 A1  Nov. 11, 2010

(51) Int. Cl.
*G06Q 30/00* (2006.01)
(52) U.S. Cl. ............... 705/14; 705/7; 705/22; 705/21; 705/28; 705/2; 705/16; 705/26; 705/27; 705/31; 705/35; 705/36
(58) Field of Classification Search ............ 705/10
See application file for complete search history.

(56) References Cited

U.S. PATENT DOCUMENTS

| 6,018,722 | A   | * | 1/2000 | Ray et al. ............... 705/36 R |
| 7,072,863 | B1  |   | 7/2006 | Phillips et al. |
| 7,092,929 | B1  | * | 8/2006 | Dvorak et al. ............ 705/28 |
| 2002/0143608 | A1 |   | 10/2002 | Brown |
| 2004/0128202 | A1 |   | 7/2004 | Baum et al. |
| 2005/0096963 | A1 | * | 5/2005 | Myr et al. ............... 705/10 |
| 2005/0273377 | A1 |   | 12/2005 | Ouimet et al. |
| 2006/0047560 | A1 |   | 3/2006 | Adams et al. |
| 2008/0294996 | A1 | * | 11/2008 | Hunt et al. ............... 715/739 |

OTHER PUBLICATIONS

Leaders by example: PG presents its annual recognition of outstanding category management programs that are driving growth in the industry. Category Captains 2003. Progressive Grocer, vol. 82, No. 17, p. 20, Nov. 15, 2003.*

* cited by examiner

*Primary Examiner* — F. Zeender
*Assistant Examiner* — Fawaad Haider
(74) *Attorney, Agent, or Firm* — Hanley, Flight & Zimmerman, LLC

(57) ABSTRACT

Example systems, methods, processes, and apparatus for determining expected base sales for a product include obtaining sales data for a product sold at a point of sale location. The sales data can be organized in a time series according to a predetermined time period. The method further includes identifying a promotional event for at least one of the product and the point of sale location and excluding sales data corresponding to the promotional event. The remaining sales data is processed using a smoothed moving average model involving a plurality of passes through the remaining sales data. Expected base data for the product is generated based on the smoothed moving average model and output to a user.

14 Claims, 14 Drawing Sheets

METHODS AND APPARATUS TO DETERMINE EFFECTS OF PROMOTIONAL ACTIVITY ON SALES

FIELD OF THE DISCLOSURE

The present disclosure relates generally to monitoring sales and, more particularly, to methods and apparatus to determine the effects of promotions on sales.

BACKGROUND

Retail establishments and product manufacturers are often interested in the shopping activities, behaviors, and/or habits of buyers. Buying activity data related to shopping can be used to correlate product sales with particular shopping behaviors and/or to improve timings or placements of product offerings, product promotions, and/or advertisements. Known techniques for monitoring buyer shopping activities include conducting surveys, counting patrons, collecting point of sale (POS) data, and/or conducting visual inspections of shoppers or patrons in the retail establishments, as well as business to business transactions.

Promotions for goods and/or services often result in additional or incremental unit sales of a product in the week the promotion is run. However, retailers and manufacturers may wish to know a normal or baseline pattern of sales without promotion effect. In that way, an effect of a promotion can be compared to a normal pattern of sales.

Evaluators and optimizers are two types of systems for studying promotional plans for products. Evaluators evaluate a promotional plan to reveal whether the implementation of that plan would cause the sales desired by the user. Optimizers use evaluators to develop new promotion plans or to suggest changes to existing promotion plans.

An existing system used to evaluate and/or optimize promotions for products is the Promotion Simulator from The Nielsen Company (US) LLC. The Promotion Simulator can be used to evaluate promotion plans implemented using regression models. The simulator takes one product and one promotion and evaluates the promotion. For example, for the product "X" brand shampoo and "Y" promotion, the simulator answers the question "would promotion 'Y' increase profits of 'X' brand shampoo by x %".

DETAILED DESCRIPTION

Figure 1:
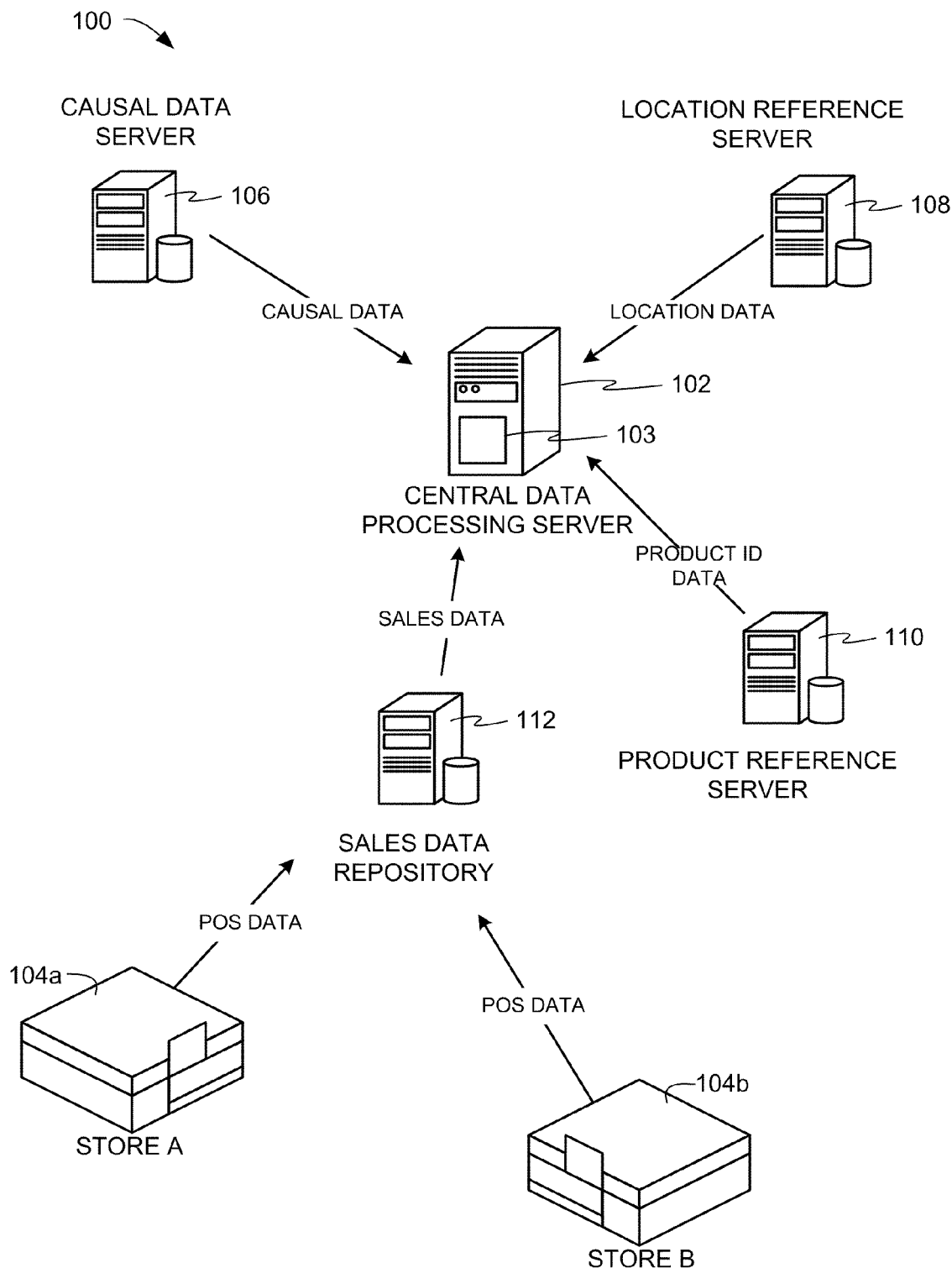
FIG. 1 depicts an example system configured to implement a syndicated sales analysis service for a plurality of sellers to analyze sales volumes information and causal factors related thereto using the example methods and apparatus described herein.

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

The example methods, systems, articles of manufacture, and apparatus described herein may be implemented by a buyer metering entity, by a business, and/or by any other entity interested in collecting and/or analyzing the effects of different causal factors on the performance of product sales. The example methods, systems, articles of manufacture, and apparatus may be used to help marketing and sales professionals better understand buyer response and how to reach and influence buyers that buy products (e.g., goods and/or services). For example, by determining a baseline (also referred to below as expected base sales) for a product (e.g., a good and/or service sold to a buyer, such as an individual consumer or other company) and analyzing different causal factors that could potentially influence product sales, the example methods and apparatus described herein can be used to determine whether those factors were or will be actually influential and the extent to which they affected or will likely affect product sales. Such information can help business management and/or other analyst(s) to better understand an impact of different effects or factors on growth of sales volumes and/or profits. In some cases, sellers may be able to control the presence of such effects or factors to influence sales performance. In other instances, although an existence or presence of contributing effects or factors cannot be controlled, an extent to which such effects or factors are allowed to influence buyer purchases may be controlled. For example, knowing that a particular product promotion will generate additional sales may prompt a store to increase its offering of that promotion.

Briefly, in some examples, a computer-implemented method of determining expected base sales for a product is provided. The computer-implemented method includes obtaining sales data for a product sold at a point of sale location. The sales data can be organized in a time series according to a predetermined time period. The method further includes identifying a promotional event for at least one of the product and the point of sale location and excluding sales data corresponding to the promotional event. The remaining sales data is processed using a smoothed moving average model involving a plurality of passes through the remaining sales data. Expected base data for the product is generated based on the smoothed moving average model and output to a user.

In some examples, an apparatus for product sales baseline determination includes a data preparation and alignment engine receiving sales data for a product and causal data identifying at least one promotional event from a point of sale and correlating the product sales data with the causal data to exclude sales data corresponding to the at least one promotional event identified in the causal data to generate non-promoted sales data for the product. The sales data is organized in a time series over a time period of interest. The apparatus also includes a modeling engine processing the non-promoted sales data using a smoothed moving average model involving a plurality of passes through the non-promoted sales data to generate expected base data for the product from the smoothed moving average model and outputting the expected base data for the product to a user.

In some examples, a machine-readable medium includes instructions which, when executed by a processing machine, implement a system for product sales baseline determination. The system includes a data preparation and alignment module receiving sales data for a product and causal data identifying at least one promotional event from a point of sale and correlating the product sales data with the causal data to exclude sales data corresponding to the at least one promotional event identified in the causal data to generate non-promoted sales data for the product. The sales data are organized in a time series over a time period of interest. The system also includes a modeling module processing the non-promoted sales data using a smoothed moving average model involving a plurality of passes through the non-promoted sales data to generate expected base data for the product from the smoothed moving average model and outputting the expected base data for the product to a user.

In some examples, a process is provided for determining expected base sales for a sold product. The process includes obtaining sales data for a product sold at a point of sale location, wherein the sales data is organized in a time series over a time period of interest. Additionally, the process includes obtaining causal data identifying at least one promotional event for at least one of the product and the point of sale location. Sales data corresponding to the promotional event are excluded to determine a time series of non-promoted sales data for the product. The non-promoted sales data is processed using a double exponentially smoothed moving average model including a smoothing constant that assigns exponentially decreasing weights to older sales data values as the sales data becomes older in time. The processing includes executing a preliminary backward pass through the remaining sales data, executing a preliminary forward pass through the remaining sales data, and averaging the preliminary backward pass and the preliminary forward pass. Then, the remaining sales data for the product is updated based on second sales data for an additional time period received for the product to provide updated sales data for the product. Updated backward and forward passes through the updated sales data are executed and the updated passes are averaged. Expected base data for the product is generated based on the double exponentially smoothed moving average model and output to a user.

In some examples, a machine-readable medium is provided including a program which, when executed, determines expected base sales for a product. The instructions obtain sales data for a product sold at a point of sale location, where the sales data organized in a time series over a time period of interest. The instructions also identify a promotional event for at least one of the product and the point of sale location and excluding sales data corresponding to the promotional event. The instructions process the remaining sales data using an exponentially smoothed moving average model involving a plurality of passes through the remaining sales data. Expected base data for the product is generated based on the exponentially smoothed moving average model and output to a user.

In some examples, a baseline process system includes a data preparation and alignment module receiving sales data for a product from a point of sale location, the sales data organized in a time series over a period of interest, and correlating the product sales data with at least one promotional event identified at the point of sale location to generate non-promoted sales data for the product. The system also includes a modeling module to process the non-promoted sales data using a multi-pass autoregressive integrated moving average model to generate expected baseline information for the product and output the expected baseline information for the product to a user.

Example methods, processes, apparatus, systems, articles of manufacture, and machine-readable medium will now be described in further detail.

Causal relationships between factors and effects can include an effect that running a promotion on a particular product during a particular point in time has on sales of that product compared to a normal baseline sales of the same product. Such an analysis can be performed for an effect on sales within the same store that ran the promotion. Additionally, analyses can be performed for an effect that a promotion in one store had or will have on sales in other store(s). While the example methods, systems, articles of manufacture, and apparatus can be used to analyze the effects on the same product for which a promotion was run, the methods, systems, articles of manufacture, and apparatus can more generally be used to determine a promotion's effects on other products. For example, while a promotion on brand-A beverage may affect current and subsequent sales of that brand of beverage, the example methods, systems, articles of manufacture, and apparatus described herein can also be used to determine how such a promotion affects sales of beverages associated with other brands. That is, the methods, systems, articles of manufacture, and apparatus described herein can be used to analyze relationships between different products and analyze cross-brand and/or cross-product sales effects.

FIG. 1 depicts an example system 100 configured to implement sales analysis for one or more of retail establishments and/or other sellers to analyze sales price/volume information and causal factors related thereto using the example methods, systems, articles of manufacture, and apparatus described herein. In the illustrated example, a central data processing server 102 receives and processes information associated with one or more points of sale (e.g., a Website, a storefront, a warehouse, a distribution center, etc). An example promotion analysis engine 103 is configured to implement a syndicated service that can centralize the processing of information from sellers (e.g., retail establishments of retail chains across a geographic region) in a substantially similar manner to enable owners and/or operators of the retail establishments to retrieve analysis results related to their retail establishments from one location (e.g., the central data processing server 102). Specifically, the central data processing server 102, via the example promotion analysis engine 103, receives information (e.g., purchase data, point-of-sale volume data, seller demographic/descriptive data, stock keeping unit (SKU) number, product universal product code (UPC) and/or other product identifier code, etc.) from one or more data sources and analyzes the information to generate sales volume data related to one or more retail establishments, wholesalers, and/or other points of sale (hereinafter individually and/or collectively referred to as sellers), such as sellers 104a and 104b, to use in determining the extent to which different effects or factors contributed to past sales for those sellers. The sales volume data generated by the central data processing server 102 can also be used to help determine the extent to which different effects or factors may affect future sales.

In some examples, to receive demographic data (e.g., classification and/or other descriptive information about a seller) related to respective monitored sellers, the central data processing server 102 can be communicatively coupled to a seller demographics server (not shown). The seller demographics server is provided with seller demographics information describing respective monitored sellers and is configured to communicate the demographics information to the central data processing server 102. In the illustrated example, seller demographic information includes demographic information about typical shoppers of corresponding sellers, sizes of seller stores, seller categories (e.g., supercenter store, supermarket store, discount store, drug store, etc.), geographic seller location, attributes of the seller location (e.g., online, brick-and-mortar store, etc.), retail organization information (e.g., part of a regional or national chain vs. independent, etc.), percentages of buyers drawn from geographic zones surrounding each seller store, etc.

To collect product reference data indicative of all products and/or services offered for sale by respective sellers, the central data processing server 102 is communicatively coupled to a product reference server 110. For each of the seller point of sale 104a and 104b or other monitored seller points of sale, the product reference server 110 is configured to store an indicator, such as a product code, product name, universal product code (UPC), and/or other individual product identifier code or indicator, corresponding to each product and/or service offered for sale by that seller. Each indicator is stored in association with the name of the product it represents and can include additional information such as enterprise, brand family, product category, size, flavor, strength, formula, package type, etc.

To collect point-of-sale (POS) sales data indicative of products and/or services sold in respective seller stores (physical and/or virtual, for example), the central data processing server 102 is communicatively coupled to a sales data repository 112. In the illustrated example, the sales data repository 112 is communicatively coupled to the seller stores 104a-b. The sales data repository 112 may further be communicatively coupled to any other monitored seller stores to collect sales data therefrom. Each of the seller stores 104a-b may store sales data in local servers (not shown) that are communicatively coupled to POS terminals at checkout counters used to perform sales transactions. In this manner, product/service sales data from all transaction logs can be communicated to the sales data repository 112 in an automated manner with minimal or no human interaction. The sales data repository 112 includes price information for one or more product indicators in the product reference server 110, for example. An indicator may be associated with several prices, each corresponding to a different offering time (e.g., a different week) at which the product's price was lower or higher than usual. For example, week-long product promotion involving a reduced price will be reflected in a week-price data set stored in association with the indicator for that product.

Similarly, a causal data server 106 is communicatively coupled to the central data processing server 102 to provide causal data identifying promotions for one or more products at one or more seller points of sale 104a-b. Causal data can include newspaper feature advertisement data, in-store (and/or other point of sale, such as online website) promotions such as displays, temporary price reductions, other marketing efforts/activity to increase sales (e.g., through television and/or other media advertising, etc.), etc. Causal data can be manually gathered, reviewed, and entered into a database at the causal data server 106 and/or causal data can be automatically extracted based on point of sale data. For example, a temporary price reduction for a product can be automatically and/or manually identified based on surrounding recorded price values for the product. The causal data can be correlated with the product point of sale data as described further below.

Furthermore, a location reference server 108 can be included and communicatively coupled to the central data processing server 102 to provide location data for the one or more participating sellers and/or particular seller stores. The location data can be used to provide a locational context to the sales and/or causal data. For example, causal data and sales data may indicate, based on their correlation with locational data, that a promotion works better to improve sales in a particular geographic region. Such context can be introduced before and/or analysis of the sales data, for example.

Figure 2:
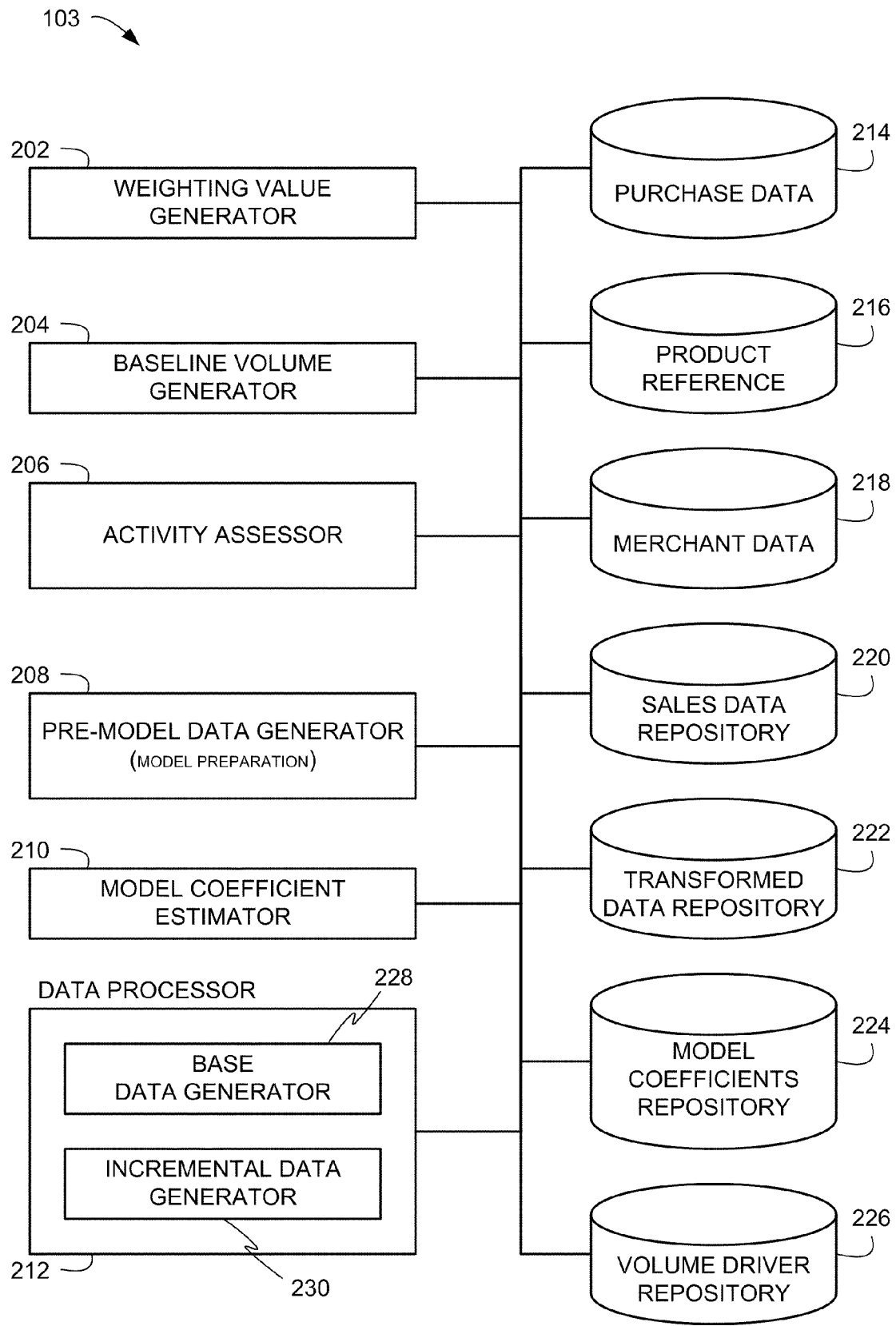
FIG. 2 is a block diagram of an example apparatus that can be used to analyze sales volumes information in connection with the example system of FIG. 1.

FIG. 2 is a block diagram of the example promotion analysis engine 103 that can be used to analyze sales volumes information in connection with the example system 100 of FIG. 1. In the illustrated example, the example promotion analysis engine 103 includes a weighting value generator 202, a baseline volume generator 204, an activity assessor 206, a pre-model data generator 208, a model coefficient estimator 210, a data processor 212, a purchase data store 214, a product reference database 216, a seller data store 218, a sales data repository 220, a transformed data repository 222, a model coefficients repository 224, and a volume driver repository 226.

The example promotion analysis engine 103 can be implemented using any desired combination of hardware, firmware, and/or software. For example, one or more integrated circuits, discrete semiconductor components, and/or passive electronic components may be used. Thus, for example, any of the weighting value generator 202, the baseline volume generator 204, the activity assessor 206, the pre-model data generator 208, the model coefficient estimator 210, the data processor 212, the purchase data store 214, the product reference database 216, the seller data store 218, the sales data repository 220, the transformed data repository 222, the model coefficients repository 224, and/or the volume driver repository 226, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc.

Figure 14:
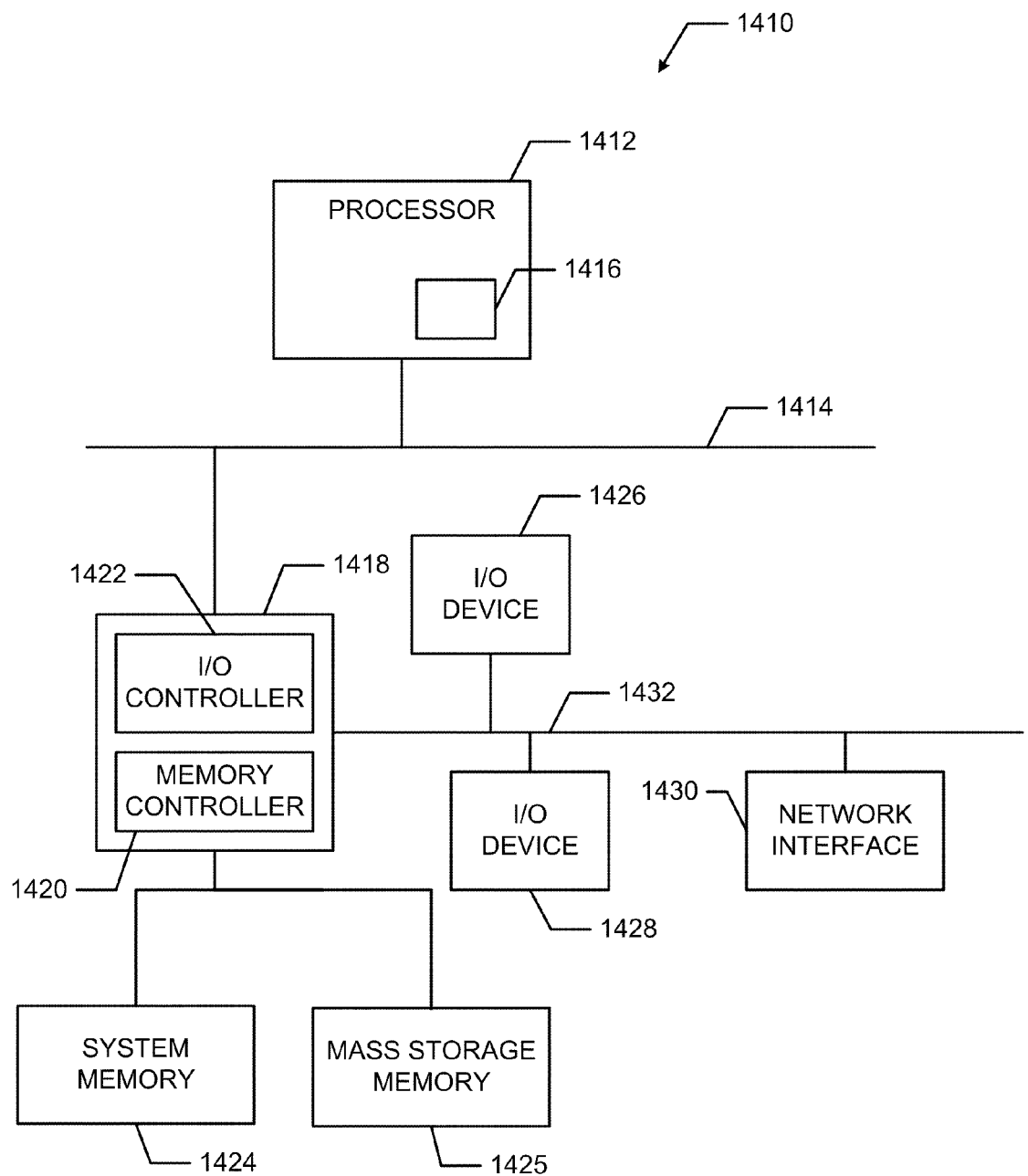
FIG. 14 is a block diagram of an example processor system that may be used to implement some or all of the example methods and apparatus described herein.
Figure 4:
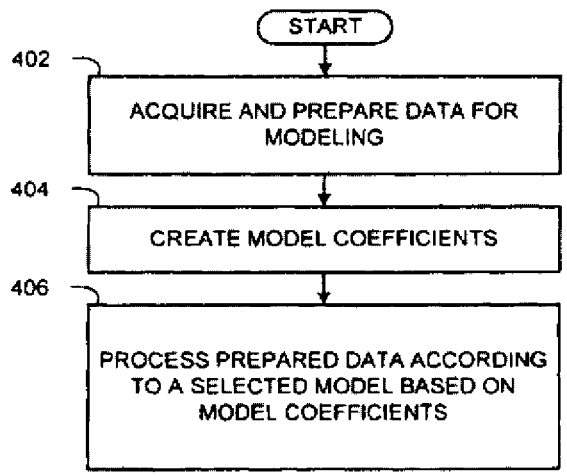
Figure 5:
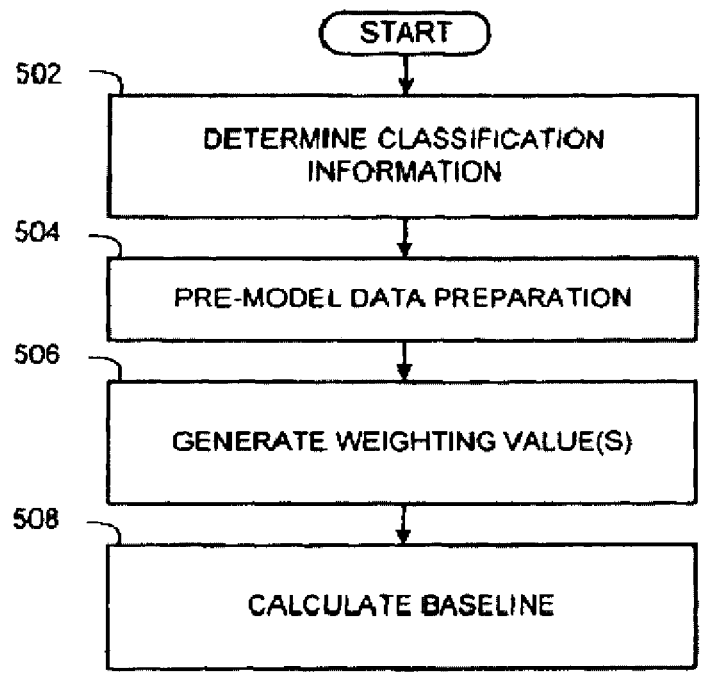
Figure 10:
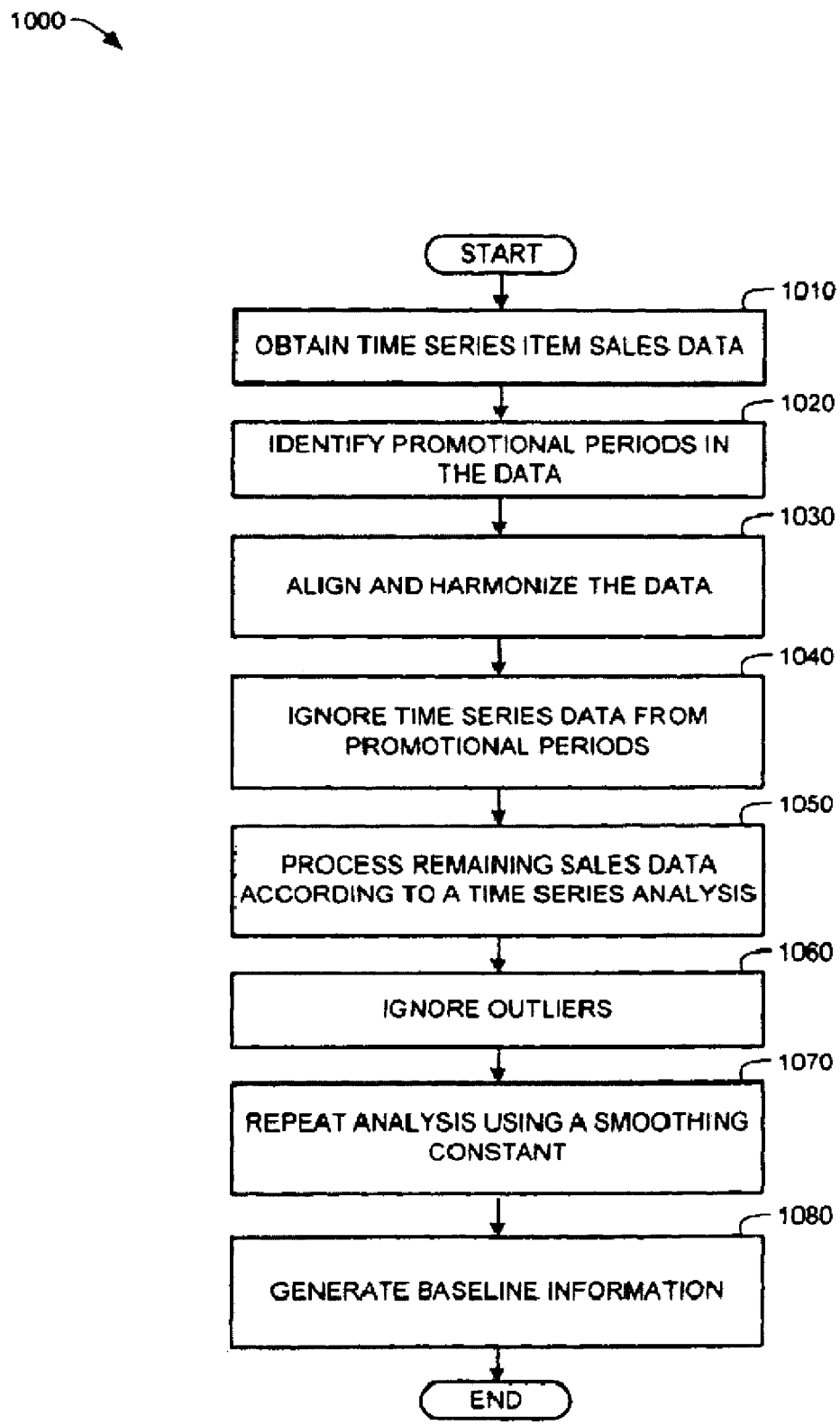

Some or all of the weighting value generator 202, the baseline volume generator 204, the activity assessor 206, the pre-model data generator 208, the model coefficient estimator 210, the data processor 212, the purchase data store 214, the product reference database 216, the seller data store 218, the sales data repository 220, the transformed data repository 222, the model coefficients repository 224, and/or the volume driver repository 226, or parts thereof, can be implemented using instructions, code, and/or other software and/or firmware, etc. stored on a machine accessible or readable medium and executable by, for example, a processor system (e.g., the example processor system 1410 of FIG. 14). When any of the appended claims are read to cover a purely software and/or firmware implementation, at least one of the weighting value generator 202, the baseline volume generator 204, the activity assessor 206, the pre-model data generator 208, the model coefficient estimator 210, the data processor 212, the purchase data store 214, the product reference database 216, the seller data store 218, the sales data repository 220, the transformed data repository 222, the model coefficients repository 224, and/or the volume driver repository 226 is hereby expressly defined to include a tangible medium such as a memory, DVD, CD, etc. storing the software and/or firmware.

Some or all of the weighting value generator 202, the baseline volume generator 204, the activity assessor 206, the pre-model data generator 208, the model coefficient estimator 210, the data processor 212, the purchase data store 214, the product reference database 216, the seller data store 218, the sales data repository 220, the transformed data repository 222, the model coefficients repository 224, and/or the volume driver repository 226, or parts thereof, can be executed initially and/or during subsequent executions of the promotion analysis engine 103.

Turning in detail to FIG. 2, the weighting value generator 202 is configured to generate one or more weighting values for one or more products to indicate a relative weight or importance of historical sales data for the one or more products based on particular criteria. For example, a weighting value for historical sales data for brand A soda may be different from a weighting value for brand B soda based on product price, frequency of sale, market, etc. For example, if product X sells frequently (e.g., a food item) and product Y sells infrequently (e.g., an appliance), then product X will have a different weighting value than product Y when analyzing product sales data as described below.

Generally speaking, the example promotion analysis engine 103 of FIG. 2 collects transaction data related to purchase data and promotion information and identifies pairings between one or more target product(s) of interest and one or more promotions occurring with respect to the one or more target product(s) at one or more monitored locations. One or more criteria and/or thresholds may be employed to align purchase/sales data with promotion causal data.

Additionally, the example promotion analysis engine 103 of FIG. 2 calculates a baseline volume of sales, which refers to the volume of sales that would occur absent promotions of the target product of interest. One or more working variables are calculated and fed into a regression model, and additional data related to the sellers by which the target and competitive products are sold is acquired by the example promotion analysis engine 103. One or more model coefficients are calculated before the example promotion analysis engine 103 of FIG. 2 facilitates a calculation of the volume sales for a target product in view of a promotion. Further, the example promotion analysis engine 103 facilitates a calculation of the volume of sales that result from the promotion in point of sale (e.g., a brick-and-mortar store, a cash register in a store, and/or an online point of sale of interest, sometimes referred to herein as a "target POS"). Without limitation, the example promotion analysis engine 103 of FIG. 2 facilitates a calculation of expected sales volumes with and without a promotion on the target product.

In the example implementations described herein, the weighting values are used to determine product sales data weighting values. Weighting values and/or other coefficients can be used to exponentially smooth and/or otherwise process product sales data over a certain period of time (e.g., a period of days and/or weeks).

Figure 3:
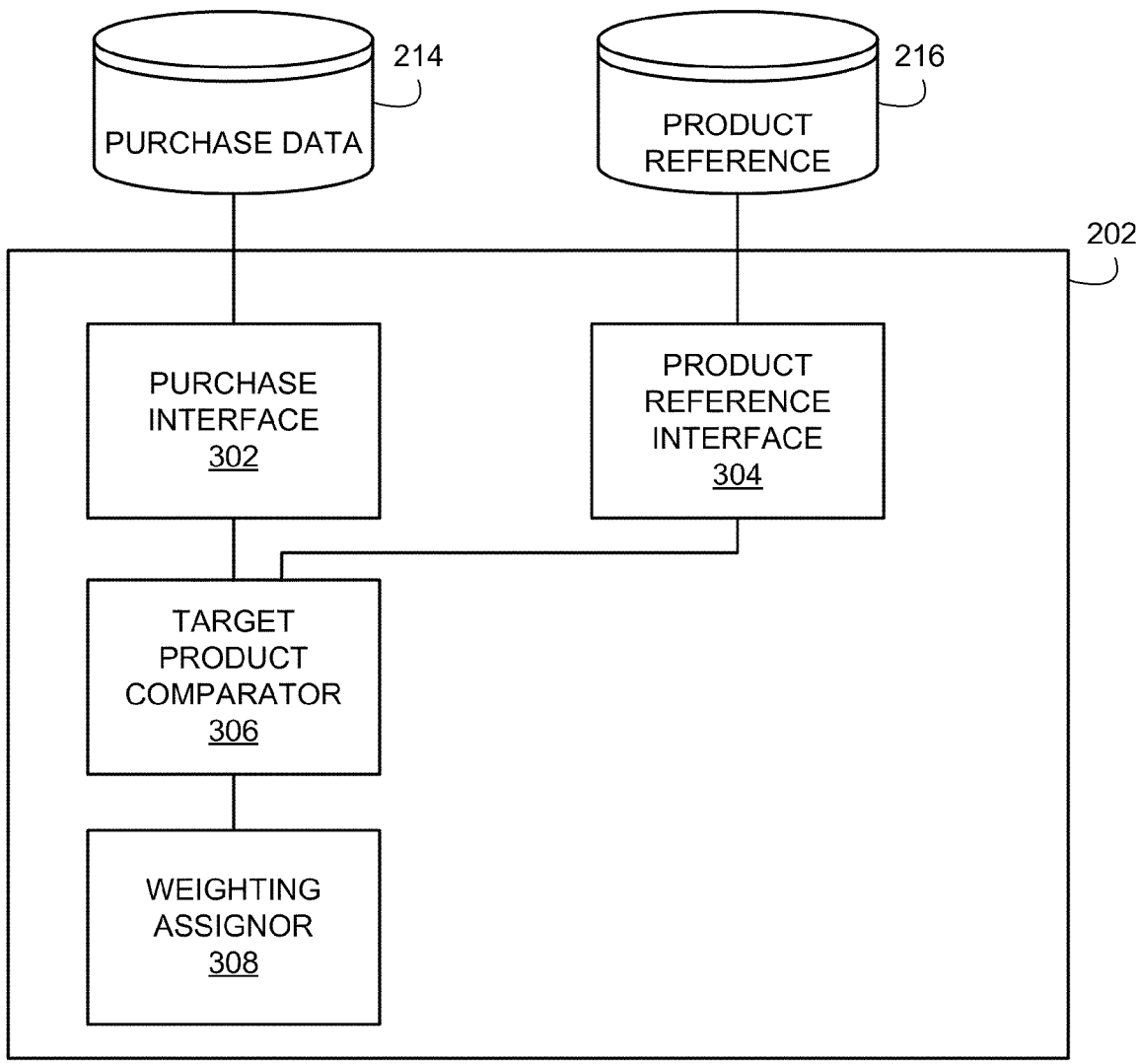
FIG. 3 is a block diagram of an example apparatus that can be used to generate weighting values in connection with the example system of FIGS. 1 and 2.

Turning briefly to FIG. 3, the example weighting value generator 202 is shown in greater detail. In the illustrated example of FIG. 3, the weighting value generator 202 includes a purchase interface 302 to communicatively connect with the purchase data store 214, and a product reference interface 304 to communicatively connect with the product reference database 216. Based on an identified target product of interest, an example target product comparator 306 processes purchase data from the purchase data store 214 for a product via the purchase interface 302 and aligns that data with data regarding that product from the product reference database 216 via the product reference interface 304. The example target product comparator 306 is coupled to a weight assignor 308 to assign or associate a weighting value for purchase/sales data for the identified target product. The weighting value can be determined by applying a calculation to determine weighting value for purchase/sales data for the identified target product (e.g., during an initial or recalibration execution) and/or by retrieving previously determined weighting value(s) to be applied to the data, for example.

Returning to FIG. 2, the baseline volume generator 204 is also configured to generate baseline volumes for one or more target products under analysis. As will be described further below, baseline volume is indicative of the normal expected sales volume for a product absent a promotion for that product. Promotions can include any type of feature advertisements (e.g., coupons or advertisements in newspapers, magazines, etc.), in-store point of purchase (POP) displays (e.g., end-aisle locations, in-store posters, window stickers, shelf talkers, coupon dispensers, etc.), other marketing drive periods (such as increases in national advertising) and/or marketing activities to increase sales (e.g., via television and/or other media advertising), and/or price reductions, for example. In the presence of promotions, promoted products typically undergo an increase in sales. To determine the effects of a promotion on the increased sales for a particular product, a baseline volume can be used to determine what the normal sales volume for that product would have been absent the promotion and determining the difference in volume (known as the incremental volume) observed between the baseline volume and the actual sales volume during the promotion period. This difference in volume or incremental volume is the volume attributable to the effects of the promotion. Different techniques are available for determining baseline volumes. One such known technique is the Box-Jenkins time series calculation. In the example implementations described herein, baseline volumes are based on a point-of-sale-(store)-week-individual product level, meaning that a baseline volume represents the sales in a particular store, during a particular week, of a particular product identified by its unique product identification code (e.g., a UPC, SKU, or other identifier).

In econometrics, the Box-Jenkins methodology, named after statisticians George Box and Gwilym Jenkins, applies autoregressive moving average (ARMA) or autoregressive integrated moving average (ARIMA) models to find the best fit of a time series to past values of this time series, in order to make forecasts for future values. In a Box-Jenkins analysis, one or more of difference operators, autoregressive terms, moving average terms, seasonal difference operators, seasonal autoregressive terms, and seasonal moving average terms can be applied to available data. Using a Box-Jenkins ARMA model for a time series of data combines an autoregressive (AR) model with a moving average (MA) model on a stationary time series of data. The ARMA model can be extended to differentiate non-stationary series from the stationary series to arrive at an ARIMA model. An ARIMA time series analysis uses changes in historical data to identify patterns (e.g., moving averages, seasonality) and forecast or predict future trends or values. An ARIMA analysis can be used to determine how much of the historical data should be used to predict the next observation and what weight should be placed on the historical values.

An example Box-Jenkins model applies an iterative three-stage modeling approach. First, a model to be applied is identified and selected. Variables are made stationary and seasonality is identified in the dependent time series. The data can be seasonally differenced, for example, to identify seasonality in the dependent series. Seasonality can indicate periods such as summer, fall, winter, and spring, holidays, recurring days such as Saturdays or weekends, etc. Plots of autocorrelation and partial autocorrelation functions of the dependent time series can be used to decide which (if any) autoregressive or moving average component should be used in the model.

Next, model parameters are estimate using econometric computation algorithms to arrive at coefficients which best fit the selected ARIMA model. Some example methods use maximum likelihood estimation or non-linear least-squares estimation.

Then model checking is performed by testing whether the estimated model conforms to the specifications of a stationary univariate process. For example, residuals should be independent from each other and constant in mean and variance over time. In some examples, plotting the mean and variance of residuals over time and performing a Ljung-Box test or plotting autocorrelation and partial autocorrelation of the residuals are helpful to identify misspecification. If the estimation is inadequate, then a better model can be built starting at the first step above. While traditional Box-Jenkins uses all available data in a time series, as described herein the time series analysis provides increased accuracy by eliminating promotional and short/long sales observations.

The illustrated example of FIG. 2 also includes a pre-model data generator 208 to generate variables to be used in a model prior to being used in one or more algorithms that ultimately yield volume estimates as a result of target product promotional activity. As discussed in further detail below, the example pre-model data generator 208 of FIG. 2 uses point-of-sale (POS) input data, purchase data, and seller data to calculate an estimated volume of products sold in response to one or more causal factors. Causal factors may include, but are not limited to, a temporary price reduction (TPR), an advertising feature (e.g., flyers describing the target product on-line, in a store, run of press, television advertising, other media advertising, etc.), a POP/display (e.g., an in-store display of the target product, such as at the end of an aisle), and/or a combination of a feature and a display.

In an example, the example pre-model data generator 208 can also minimize and/or eliminate data anomalies due to seasonality effects. For example, in the event that the sale of chocolates is particularly high during the months of December and February (e.g., Christmas holiday and Valentines Day), corresponding sales peaks of such products may occur absent a promotion. Seasonality can also include a regular period, such as a weekend or a Saturday, that defines a predictable or regularly-occurring spike or "season" affecting product sales. As such, the example pre-model data generator 208 calculates a dimensionless index to minimize such expected peaks of chocolate sales so that corresponding volume data calculations are not artificially high.

The example pre-model data generator 208 can also calculate equivalent volumes and base equivalent volumes for products to eliminate, for example, product packaging disparities. Such disparities occur when a product manufacturer sells products with varying pre-packaged quantities, which may prevent direct comparisons between the same brands on a per-unit sale basis. For example, Coke® sells 12-ounce cans of cola as well as 2-liter bottles of cola. On a per-unit sale of a 6-pack UPC and a 2-liter UPC sale, direct comparison is not representative of a true measure of the ultimate amount of cola sold (i.e., a 2-liter bottle is approximately 68 ounces). As such, the pre-model data generator 208 converts one or more target products of interest into a corresponding equivalent volume unit to, in effect, implement a common base-comparison unit for all brand package configurations. In the illustrated example above, a common base-comparison unit for Coke® cola products (whether such products are sold in cans or bottles) is units of ounces.

In an example, one or more competitive effects variables can also be incorporated by the example pre-model data generator 208. Generally speaking, there are three actions that a competitor can take to affect sales of the target product. In particular, the competitor can increase or decrease the amount of promotion activity, the competitor can change their regular price, and/or the competitor can put new UPCs on store shelves. Increasing or decreasing the amount of promotion activity may include running features, displays, temporary price reductions, and/or any combination thereof.

In view of the fact that statistical analysis techniques may include the phenomenon in which there are multiple sources of randomness in the data, the example pre-model data generator 208 minimizes and/or eliminates such effects. Sources of variation include cross-store variants and randomness that occur over time.

While calculation of one or more corresponding effects on product sales volumes may be conducted in view of a current week for a particular point of sale, the methods, systems, articles of manufacture, and apparatus described herein also examine cross-store promotional effects. Point of sale categories typically exhibit characteristic patterns due to, in part, different degrees of homogeneity with similar points of sale. For example, store characteristics related to a percent of Hispanic shoppers, African-American shoppers, and/or stores within certain latitudes/longitudes (e.g., particularly poor neighborhoods, particularly affluent neighborhoods, etc.) may have corresponding sales expectations that are statistically relevant and assist the process of projecting sales volume estimations. As discussed in further detail below, the example pre-model data generator 208 incorporates such store characteristics when calculating effects due to promotional activity.

Estimations derived from a model-based approach typically differ from estimations derived from an algorithm-based approach. As such, the example pre-model data generator 208 also calibrates regression-based incremental volume estimates for effects in a manner that aligns with estimates derived from an algorithmic baseline approach. As described above, the baseline is an estimate of sales in the absence of a feature, a display, or a price cut. Any difference between the baseline and the total unit sales is referred to as an incremental volume, which is attributed to the presence of causal factors of a corresponding feature, display, or price cut.

The model coefficient estimator 210 is configured to generate coefficient values that may be used in one or more algorithms to estimate one or more of volumetric sales effects of products in view of causal factors (e.g., promotional activity) at a target point of sale. Some modeling techniques view the target products and competitive products as nested or combined within one point of sale and/or multiple points of sale. Additionally, the one or more points of sale are further nested within geographic localities, which reside within delineated marketing target areas.

The example data processor 212 of FIG. 2 is configured to employ one or more algorithms that utilize one or more variables prepared by the example pre-model data generator 208 and one or more model coefficients from the example model coefficient estimator 210. The example base data generator 228 of the data processor 212 calculates, in part, a sales volume due to product sales according to the model coefficients and/or other variables as discussed above. Additionally, an example incremental data generator 230 of the data processor 212 calculates, in part, raw sales data volumes that are specific to one or more causal types. Causal types include, but are not limited to, corresponding volumes based on a price-cut, a feature, a display, and/or one or more combinations thereof.

Figure 4:
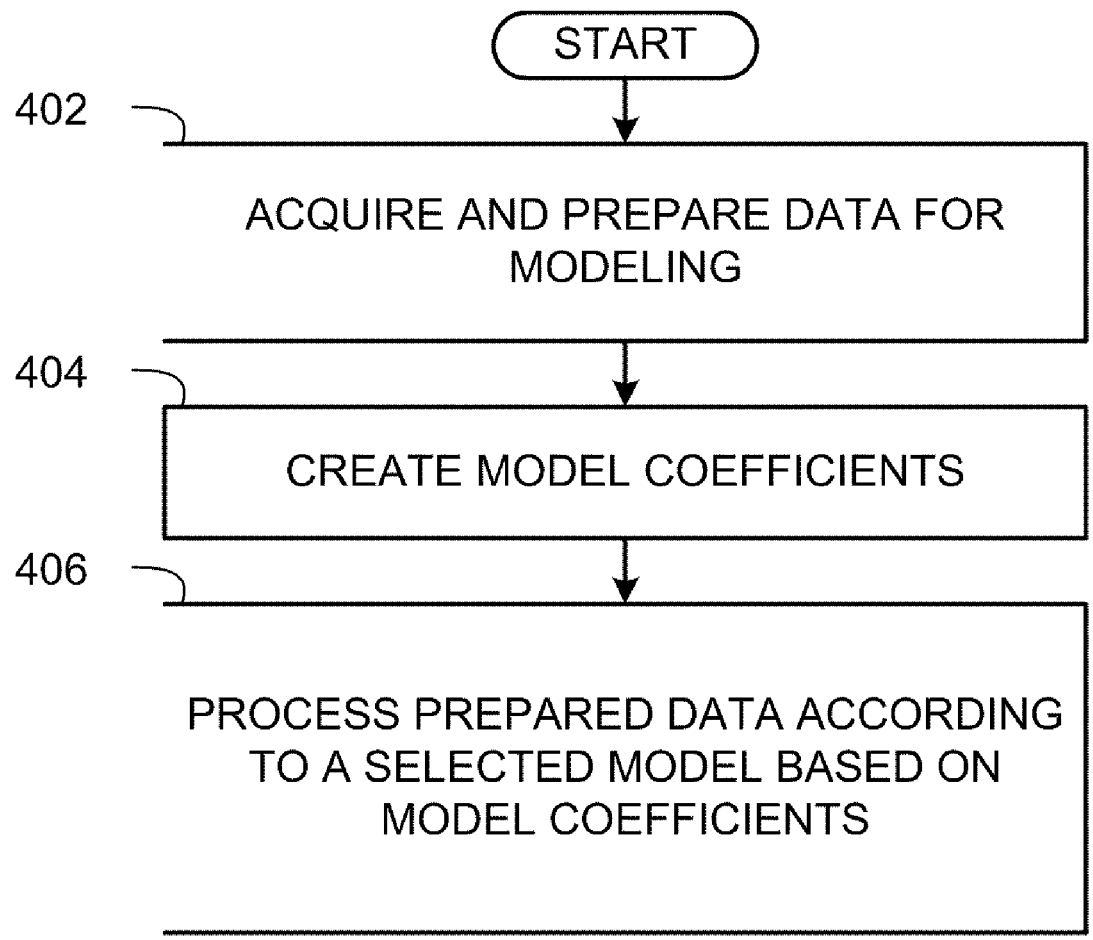
FIG. 4 is a flow diagram representative of machine readable instructions that may be executed to analyze sales volumes information and causal factors related thereto for sellers under analyses in connection with the example system of FIG. 1.
Figure 5:
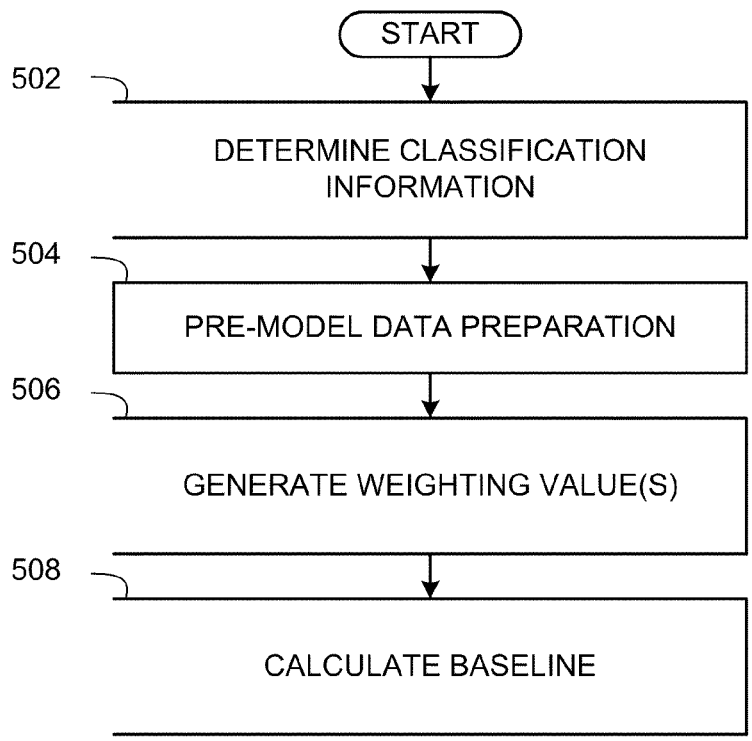
FIG. 5 illustrates a flow diagram representative of machine readable instructions that may be executed to acquire and prepare data for modeling in connection with the flow diagram of FIG. 4.

FIGS. 4 and 5 are flow diagrams representative of machine readable and executable instructions or processes that can be executed to implement the example promotion analysis engine 103 of FIG. 2. The example processes of FIGS. 4 and 5 can be performed using a processor, a controller and/or any other suitable processing device. For example, the example processes of FIGS. 4 and 5 can be implemented in coded instructions stored on a tangible medium such as a flash memory, a read-only memory (ROM) and/or random-access memory (RAM) associated with a processor (e.g., the processor 1412 of FIG. 14). Alternatively, some or all of the example processes of FIGS. 4 and 5 can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 4 and 5 can be implemented manually or as any combination(s) of any of the foregoing techniques, for example, any combination of firmware, software, discrete logic and/or hardware. Further, although the example processes of FIGS. 4 and 5 are described with reference to the flow diagrams of FIGS. 4 and 5, other methods of implementing the processes of FIGS. 4 and 5 can be employed. For example, the order of execution of the blocks may be changed, and/or some of the blocks described may be changed, eliminated, sub-divided, or combined. Additionally, any or all of the example processes of FIGS. 4 and 5 can be performed sequentially and/or in parallel by, for example, separate processing threads, processors, devices, discrete logic, circuits, etc.

Turning to FIG. 4, initially, the example promotion analysis engine 103 of FIG. 2 acquires sales data of products from multiple sources (block 402). In the illustrated example of FIG. 4, point-of-sale (POS) data is retrieved, which is indicative of sales for product UPCs and/or other individual product identifier codes, seller location(s) in which the product(s) were sold, sale dates, and/or volumes for each UPC sold in a given week. Sellers may include traditional channels, such as grocery stores, community hardware stores, and/or convenience stores, but specialty channels may further include discount stores, specialty food stores, large-scale hardware stores, and/or office supply stores. Sellers/points of sale can be brick-and-mortar physical locations and/or virtual online locations, for example. Additionally, the retrieved POS data includes information related to an amount of money paid for the product(s) and whether the product(s) were associated with, or the subject of a promotion. Promotion information may include, but is not limited to, a feature (e.g., a flyer, coupon, advertisement), a display (e.g., an in-store display), and a location and/or size of the display (e.g., end of aisle, large placard, etc.), and/or other marketing/advertising efforts.

The POS data may be collected, sold, and/or otherwise distributed by any third-party responsible for data acquisition, such as The Nielsen Company (US) LLC®. For example, The Nielsen Company (US) LLC® has long compiled data via its Scantrack® system. With the Scantrack® system, sellers install equipment at the POS that records the UPC of every sold product(s), the quantity sold, the sale price(s), and the date(s) on which the sale(s) occurred. The POS data collected at the one or more stores is periodically exported to The Nielsen Company (US) LLC® where it is compiled into one or more databases, such as the example sales data repository 220 of FIG. 2. Alternatively or in addition, The Nielsen Company (US) LLC® employs a Homescan® system to measure buyer behavior and identify sales trends. With the Homescan® system, households are selected to be statistically representative of one or more demographic components of the population to be measured. One or more participants of these selected households are provided with home scanning equipment and agree to use that equipment to identify, and/or otherwise scan the UPC of every product that they purchase and to note the identity of the retailer or wholesaler (collectively or individually referred to as "seller") from which the corresponding purchase was made. The data collected via this scanning process is periodically exported to The Nielsen Company (US) LLC®, where it is compiled into one or more databases, such as the example purchase data store 214 of FIG. 2.

In the illustrated example of FIG. 4, acquired sales data (block 402) also includes seller data. For example, each seller store includes characteristic data related to its size, number of employees, all commodity volume (ACV) sales, location, and/or one or more census blocks that surround the seller. The Nielsen Company (US) LLC® also categorizes such sellers (e.g., retailers and/or wholesalers) and/or compiles data related to the store characteristics via its TDLinx® system. In the TDLinx® system, data is tracked and stored that is related to, in part, a seller store parent company, the parent company marketing group(s), the number of stores in operation, the number of employee(s) per store, the geographic address and/or phone number of the store(s), and/or the channel(s) serviced by the store(s). Data indicative of the seller store(s) may be stored in the example seller data store 218 of FIG. 2.

Returning to FIG. 4, model coefficients are created (block 404) in a manner consistent with the modeling technique(s) selected by one or more analysts. As described above, the selected modeling technique(s) may include, but are not limited to linear regression, multiple linear regression, and/or hierarchical linear modeling to set one or more coefficient values. After setting the one or more coefficient values, such as the fixed-effect coefficients and/or the random-effect coefficients to a non-default zero value (block 404), the example promotion analysis engine 103 processes such coefficients, acquired data, and prepared variables using one or more algorithms (block 406), as described in further detail below.

FIG. 5 is a flowchart representative of example machine readable instructions that may be executed to acquire and prepare data for modeling at block 402 of FIG. 4. At block 502 of FIG. 5, classification information, such as seller classification information, product classification, and/or other classification information, is determination. Acquired data and product information are further used by the example premodel data generator 208 to generate working variables (block 504) to facilitate base and incremental sales determinations. At block 506, the example weighting value generator 202 creates one or more weighting values to apply to collected sales data for each target product of interest.

To allow an understanding of how causal factors, such as promotional prices (e.g., price reductions), displays, and/or features affect sales volumes, the example baseline volume generator 204 calculates a baseline volume sales estimate (block 508) that results in the absence of any promotional activity. The difference between the calculated baseline volume (block 508) and product(s) sold in excess of that baseline are referred to as incremental sales.

In certain examples, total sales for a product can be decomposed into expected base sales plus incremental sales. Expected base sales can be defined as sales of a product in the absence of a promotion for a given time period. Incremental sales can be defined as sales of a product driven by the positive impact of short term events (e.g., promotion conditions). Expected base sales of a product, for example, can be driven by brand health, equity advertising, long-term promotions, marketing support, etc. Expected base sales can be calculated for each specific product using a time-series statistical algorithm, for example. Incremental sales represent a short term "increase" in sales (e.g., less than 8 weeks) due to a promotion. Incremental sales may simultaneously reflect multiple types of activity such as a price discount, a product theme, and advertising at the point of sale. Incremental sales can be calculated for each specific product sold by subtracting expected base unit (EBU) sales from total sales.

For example, causal data is captured or created by a particular seller and is integrated with point of sale (POS) data generated by a research organization, such as The Nielsen Company (US) LLC®. Causal data representing displays can be manually noted or reported, for example. Price cuts can be statistically derived by analyzing surrounding price data, for example. Using only the non-promoted weeks, an estimate of the point of sale's expected base sales using a time-series algorithm is created. A difference between the actual sales and the baseline sales represents the incremental sales driven by promotion.

Expected base sales can be determined for a product at a particular point of sale. For example, creating expected base data for each product, for each, day for each participating point of sale is a multi-step process. In certain examples, "Expected Base" data are exponentially smoothed moving averages of daily observations of normal non-promoted unit sales. For example, a Box-Jenkins time series can be used to determine expectations of non-promoted product sales volume calculated at the day, point of sale (e.g., a store, a register within a store, a website, etc.) and/or unit product level. These statistical models are traditionally applied to all observations in a time-series. However, additional accuracy is gained by applying these techniques to non-promoted observations only (e.g., based on a day or over a week). That is, to produce a more accurate measure of sales and unit sales in the absence of a product promotion, non-promoted observations (e.g., daily product sales) can be used. To gain the additional accuracy, sales data is integrated with "causal" data that clearly identifies promotion activity at the sold product level. Furthermore, outlier sales data, such as short and long sales, can be ignored as well.

An example Box-Jenkins model is discussed above in connection with ARMA or ARIMA. In further example detail, an exponential moving average (EMA), or an exponentially weighted moving average (EWMA), which applies weighting factors that decrease exponentially may be employed. The weighting for each older data point decreases exponentially, placing more importance on recent data points while not discarding older data entirely. A degree of weighing decrease can be expressed as a constant smoothing factor $\alpha$, a number between 0 and 1. Smooth factor $\alpha$ can be expressed as a percentage, so a smoothing factor of 10% is equivalent to $\alpha=0.1$. Alternatively, $\alpha$ can be expressed in terms of N time periods, where $\alpha=2/(N+1)$, for example.

Exponential smoothing is a technique that can be applied to time series data to produce smoothed data for presentation and/or to generate predictions or forecasts regarding future data or trends. The time series data represents a sequence of observations or measurements. Whereas in single moving averages the past observations are weighted equally, exponential smoothing assigns exponentially decreasing weights as the observations become older in time. In exponential smoothing, the raw data sequence can be represented by $\{x_t\}$, and an exponentially smoothed output can be represented as $\{s_t\}$. The output can be interpreted as an estimate of what the next value of x will be. When the sequence of observations begins at time t=0, the simplest form of exponential smoothing is given by the equations:

$$s_0 = x_0$$

$$s_t = \alpha x_t + (1-\alpha) s_{t-1}'$$

where $\alpha$ is the smoothing factor, and $0 < \alpha < 1$.

Thus, the smoothed data $s_t$ is a weighted average of the latest data $x_t$ and the previous smoothed data $s_{t-1}$. Values of $\alpha$ close to one provide less of a smoothing effect and give greater weight to recent changes in the data, while values of $\alpha$ closer to zero provide a greater smoothing effect and are less responsive to recent changes in the data. In some examples, an operator selects a value for $\alpha$. In other examples, a statistical technique can be used to optimize or improve a value for $\alpha$. For example, a least squares method can be used to determine a value for $\alpha$ for which the sum of the quantities $(s_{n-1} - x_n)^2$ is reduced or minimized. This form of exponential smoothing is also known as "Brown's exponential smoothing" and as an "exponentially weighted moving average." It can also be classified as an ARIMA(0,1,1) model with no constant term.

By direct substitution of the defining equation for exponential smoothing back into itself, the smoothed statistic is determined as follows:

$$\begin{aligned} s_t &= \alpha x_t + (1-\alpha) s_{t-1} \\ &= \alpha x_t + \alpha(1-\alpha) x_{t-1} + (1-\alpha)^2 s_{t-2} \\ &= \alpha [x_t + (1-\alpha) x_{t-1} + (1-\alpha)^2 x_{t-2} + \\ &\quad (1-\alpha)^3 x_{t-3} + \ldots ] + (1-\alpha)^t x_0. \end{aligned}$$

That is, as time passes the smoothed statistic $s_t$ becomes the weighted average of an increasing number of the past observations $x_{t-n}$, and the weights assigned to previous observations are in general proportional to the terms of the geometric progression $\{1, (1-\alpha), (1-\alpha)^2, (1-\alpha)^3, \ldots\}$. This process is referred to as exponential smoothing since a geometric progression is the discrete version of an exponential function.

In an example, non-exponential smoothing can be applied to the data to apply weights in a non-exponential manner. Alternatively, non-weighted data smoothing can be applied to the data. A type of smoothing (e.g., exponential, non-exponential, weighted, non-weighted, etc.) can be determined based on one or more criteria such as data source, data quality, time period, etc.

Figure 6:
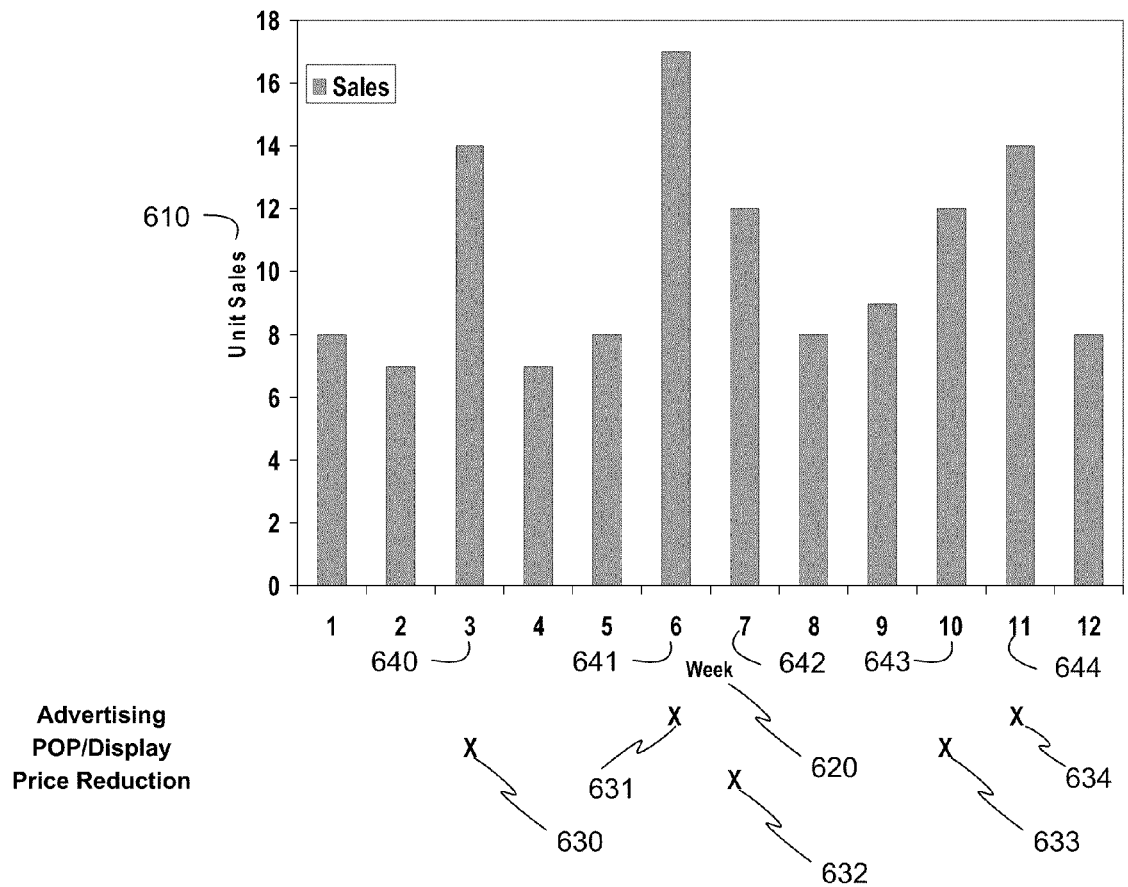
FIG. 6 illustrates an example graph representative of total product sales data including both base sales and incremental sales in conjunction with causal data.

Exponential smoothing can be applied to product sales, for example. FIG. 6 shows example total product sales data including both base sales and incremental sales. An axis 610 indicates a number of unit sales, and an axis 620 indicates a time period (e.g., a week) corresponding to each unit sales amount. As discussed above, unit sales data can be gathered for one or more products at one or more locations using one or more measures, such as UPC, cash register data, etc. Sales data for consumables such as food items, appliances, clothing, electronics, etc., can be tracked as represented in the baseline illustration of FIG. 6. Indicators 630-634 correlate causal data (e.g., promotional activity such as a particular theme, price reduction, and/or other promotion) with sales data for a given week 640-644. Using the causal data indicators 630-634, unit sales data for certain anomalous weeks 640-644 can be identified and removed.

Figure 7:
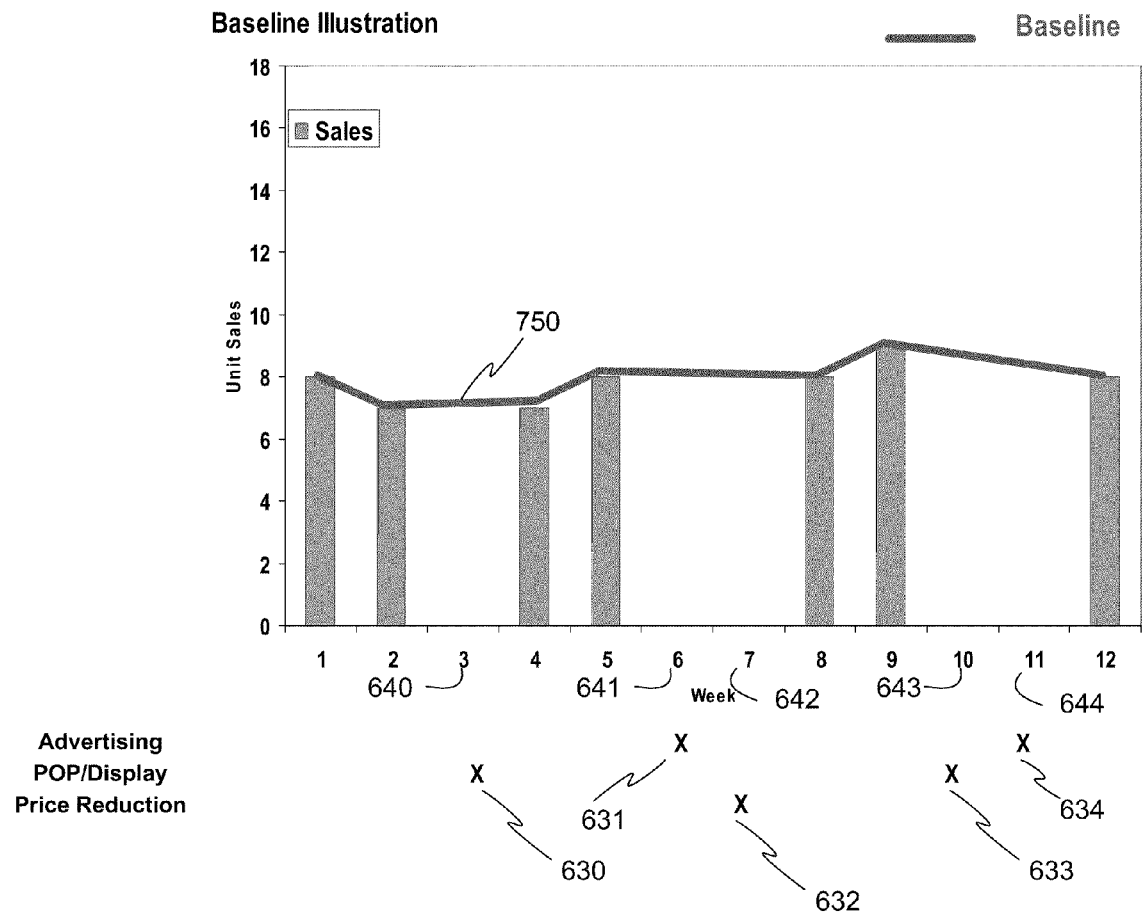
FIG. 7 illustrates an example graph representative of total product sales data ignoring sales generated in conjunction with promotional events based on causal data.

In certain examples, as illustrated in FIG. 7, data from promotional weeks 3, 6, 7, 10, and 11 (represented by 640-644) are eliminated based on the corresponding causal data 630-634. Using only the non-promoted weeks 1, 2, 4, 5, 8, 9, and 12, an estimate of the store's expected base sales can be generated using a time-series algorithm. This baseline 750 is represented in FIG. 7. As shown, for example, in FIG. 8, a difference 860-864 between actual sales and baseline sales 750 represents incremental sales driven by promotion.

In certain examples, creating initial Expected Base facts for each sold product is a multi-step process involving multiple passes through the product sales data. For example, four passes through the product sales data provides Expected Base sales data for a product. In some examples, an Expected Base sales data model is provided with twenty-six weeks of data including data indicating periods of promotion for the product.

In some examples, an Expected Base calculation flow includes integrating causal data with sales data for a product to identify the promoted and non-promoted weeks. Causal data can be used to exclude days with promotions, temporary price reductions, and/or modeled "long sale" data, for example. For example, regular prices can be estimated for a given week using historical prices. Temporary price reductions can be set by day by comparing a daily price to a week's regular price.

A forward preliminary pass is performed through the data at the baseline using only non-promoted observations. A backward preliminary pass is performed through the data at the baseline using only non-promoted observations. The two preliminary passes are averaged. Short and long sales are calculated. For example, short and long sales can be calculated using a variance-based approach with one or more model coefficients and/or parameters set using values for a particular country in which the product is sold. The short and long sales represent "outliers" or greatly varying data points that can be excluded from the results following the calculation. Short sales (e.g., less than expected) and long sales (e.g., greater than expected) sales represent the outliers, such as the upper 2.5% and the lower 2.5% in sales data that are excluded to provide a more efficient and accurate baseline determination. Short and long sales can provide valuable insight because they can each be treated as unidentified causal data or conditions. For example, if the sales data includes a spike in sales that is much larger than average but no particular causal data has been capture, the long sale may represent another causal factor that was not otherwise captured. Competitive effects, market effects, etc., can be represented in that data. A data event that has been captured (e.g., a long sale) can be an event to be reported (e.g., a special non-promotional event resulted in increased sales).

Next, the forward final pass of the baseline data is re-calculated, followed by re-calculating the backward final pass of the baseline. The two final passes are averaged. Using an exponentially smoothed model, reported Expected Base data is generated from the averaged final pass data.

During the update of Expected Base data through multiple passes, "new" data is used to update the previously calculated result. For example, a forward preliminary pass can advance or "roll" the 26 week period forward by one week and eliminate the oldest data in the time series. For example, data from the first week of January can be counted in the preliminary forward and backward passes and ignored in the final forward and backward passes. Exponential weighting can be applied to older observations such that recent observations are more heavily weighed than older observations, for example.

For each week of new data regarding a sold product, the added data can be used to update the baseline calculation for Expected Base sales. Causal data is integrated with the sales data to identify promoted and non-promoted weeks for the product. As with the initial set of calculations described above, a forward preliminary pass is performed at the baseline using only non-promoted observations. A backward preliminary pass is executed at the baseline using only non-promoted observations. The two preliminary passes are then averaged. Short and long sales are calculated (e.g., using one or more variance based parameters set using a particular country or region's data), the data points outside a certain preset acceptable range (e.g., the "outliers") are excluded. Then, the forward final pass of the baseline and the backward final pass of the baseline are recalculated and averaged. Expected Base facts for reporting are then determined using an exponentially smoothed model.

Thus, in certain examples, baseline data can be updated as new data becomes available. To initiate a baseline calculation forward and backward passes are executed through the data using sales data for weeks one through twenty-six. When data for week twenty-seven becomes available, data for weeks two through twenty-seven are used to update the calculation process.

For a given day T, all available days of data contribute to the baseline estimate for day T. Daily sales and baselines for the following periods provide model variables for day T: sales from eight days prior to time T (time T−8), sales from seven days prior to time T (time T−7), and sales from one day prior to time T. A multi-pass process creates a "smooth", centered average baseline. Passes include forward in time iterations staring with an oldest available time period and backward in time iterations starting with a most recent time period, for example. A first forward and backward pass are used for long sales identification and to determine starting points for a final forward and backward pass. The final forward and backward passes are then averaged.

Figure 9:
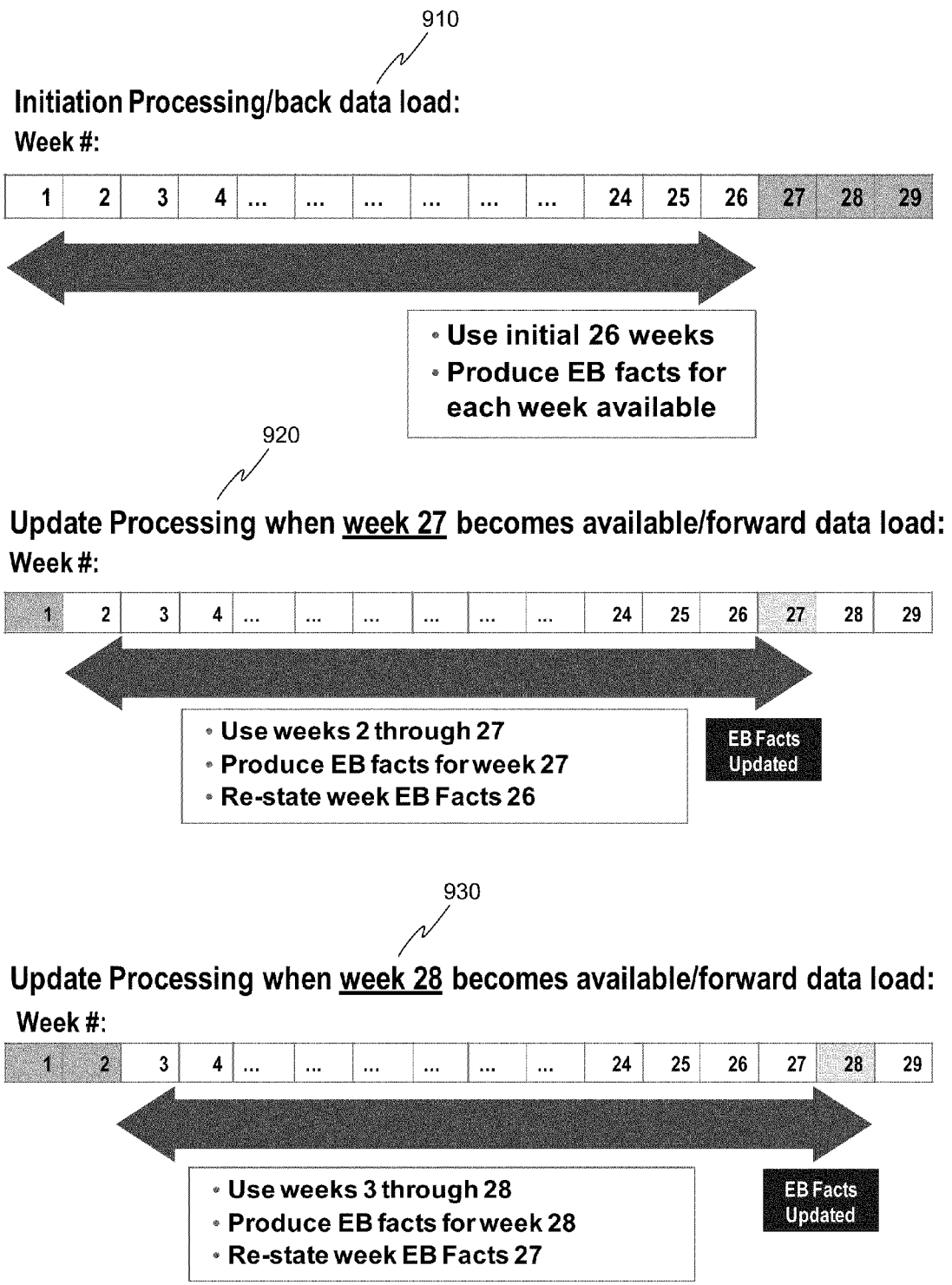
FIG. 9 illustrates a flow diagram representative of a process for analyzing sales data and determining expected base facts for the product(s) in question.

For example, as illustrated in FIG. 9, suppose twenty-six weeks of data are available for a product. To initiate a baseline calculation at 910, forward and backward passes are performed through the available data. When data for week 27 becomes available at 920, data from weeks 2 through 27 is used to update the baseline calculation. For example, two weeks of Expected Base information can be delivered. Data for week 26 can be restated because the additional data from week 27, which is used to build or rebuild the data estimate, provides greater accuracy. When data for week 28 becomes available at 930, data from weeks 3 through 28 is used to update the baseline calculation. Expected Base data can then be delivered for week 28. Data for week 27 can be restated based on the additional week 28 information. Similarly, when data for week 29 becomes available, data for weeks 4 through 29 can be used to update the baseline calculation process. Expected Base facts for week 29 can be delivered, and data for week 28 can be restated.

Figure 10:
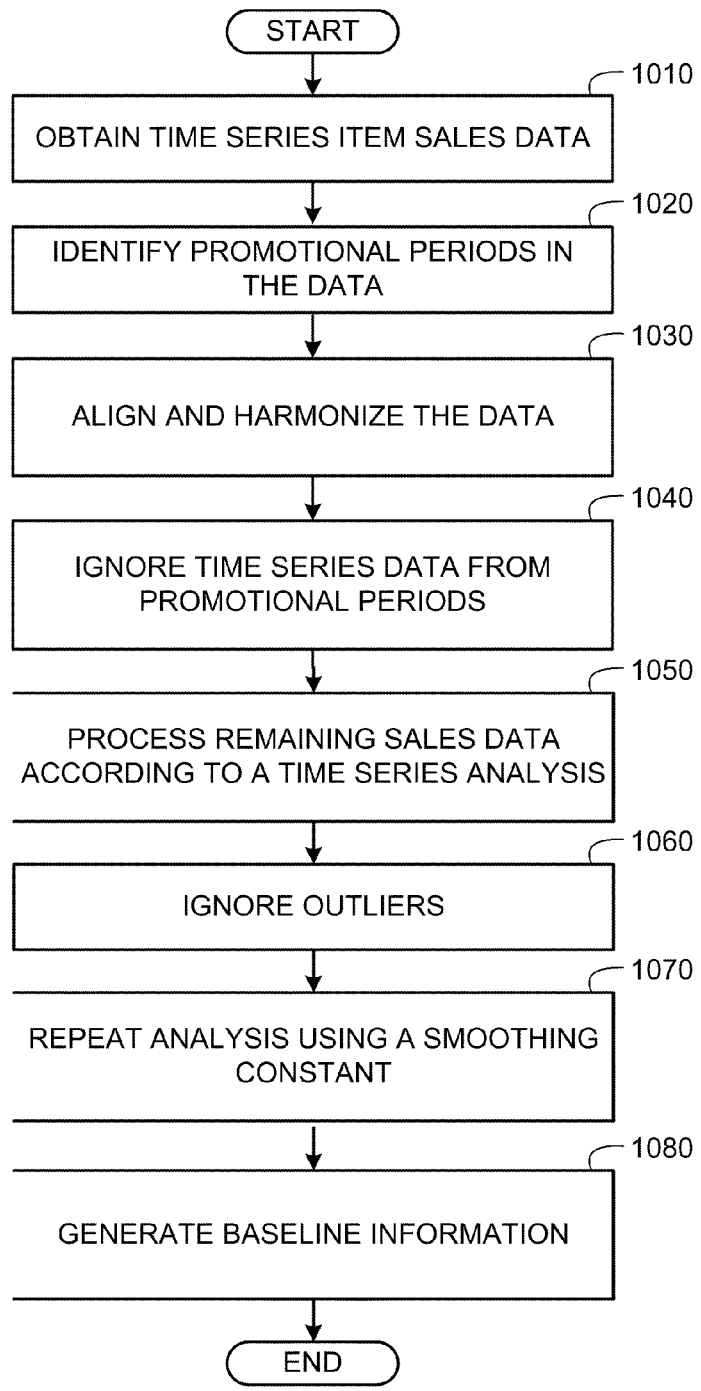
FIG. 10 illustrates a flow diagram representative of machine readable instructions that may be executed to calculate baselines and incremental sales volumes for one or more products.
Figure 11:
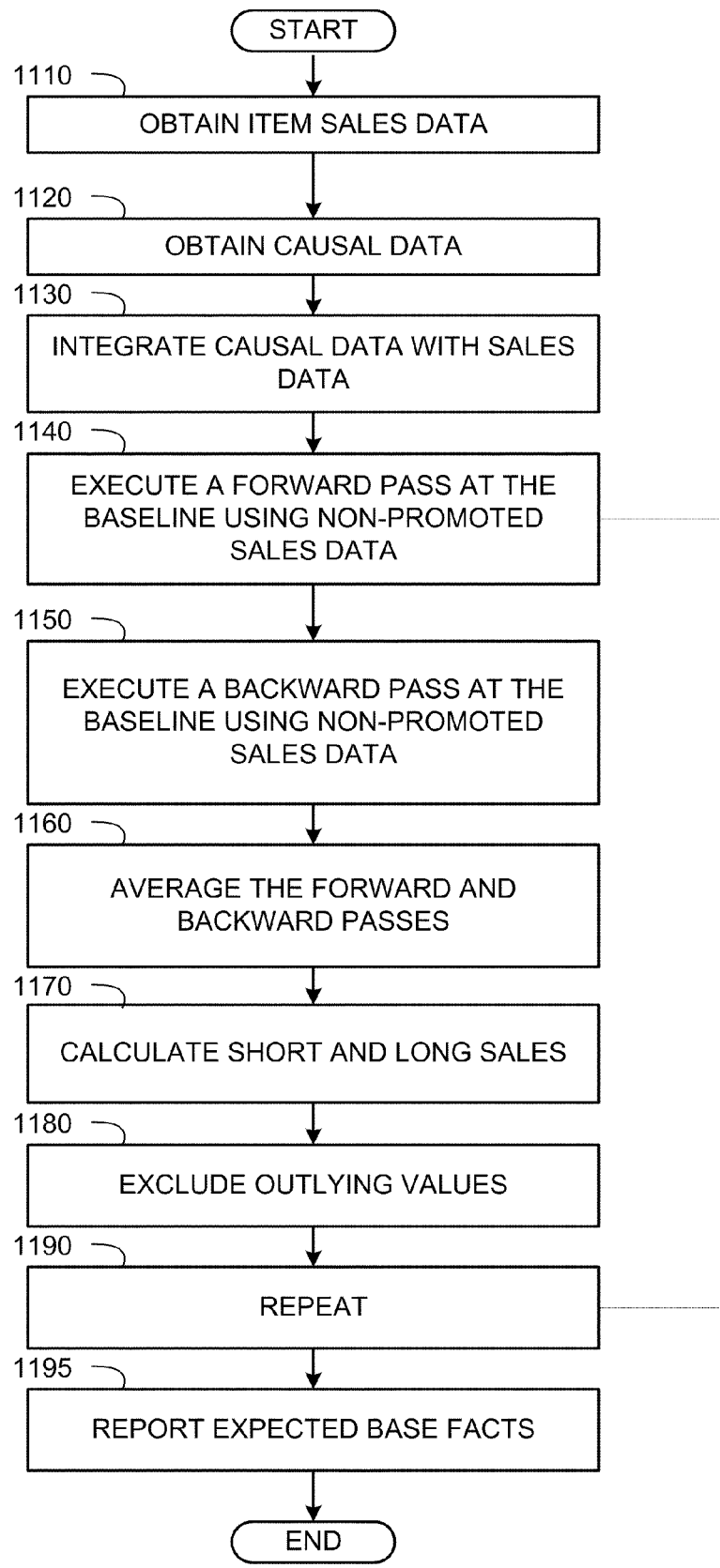
FIG. 11 illustrates a flow diagram representative of machine readable instructions that may be executed to calculate baselines and incremental sales volumes for one or more products.
Figure 12:
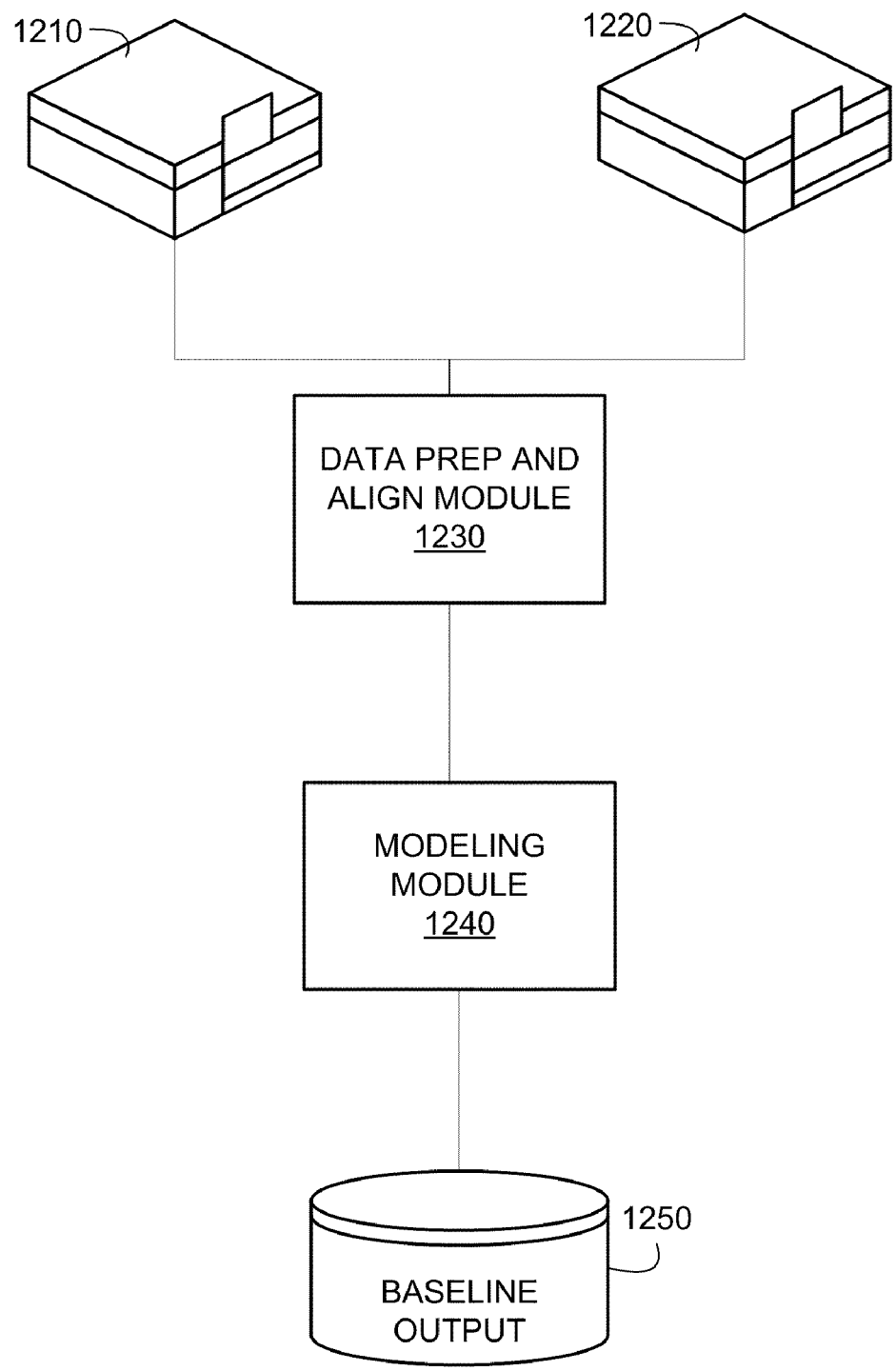
FIG. 12 is a block diagram of an example baseline process system that may be used to generate a model for time series sales data and provide a baseline in connection with the flow diagrams of FIGS. 9-11.
Figure 13:
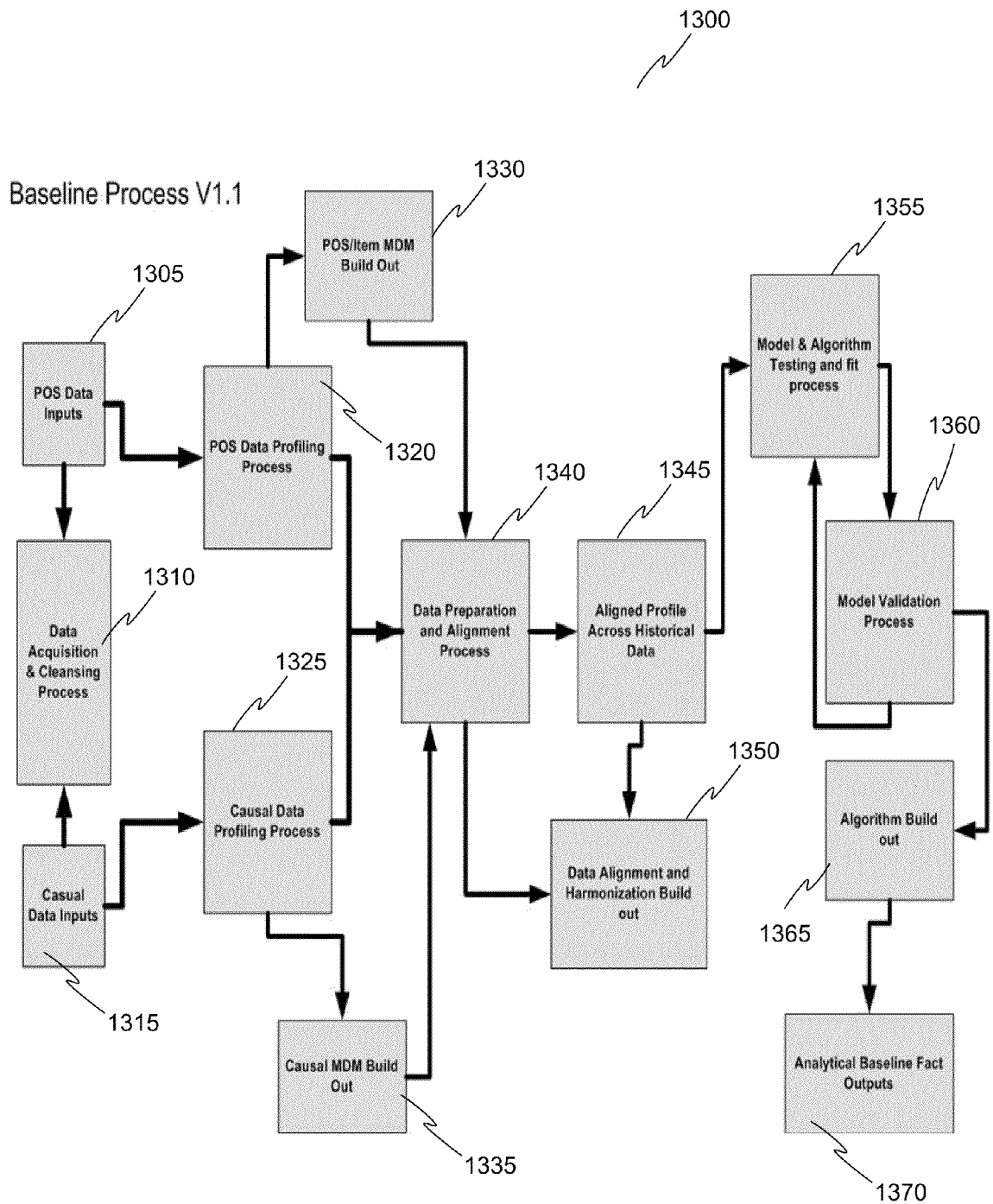
FIG. 13 is a block diagram of an example baseline process system that may be used to generate a model for time series sales data and provide a baseline in connection with the flow diagrams of FIGS. 9-11.

FIGS. 10 and 11 are flow diagrams representative of machine readable and executable instructions or processes that can be executed to implement example product baseline analysis, including the baseline processing engines 1200 and 1300 of FIGS. 12 and 13, respectively. The example processes of FIGS. 10 and 11 can be performed using a processor, a controller and/or any other suitable processing device. For example, the example processes of FIGS. 10 and 11 can be implemented in coded instructions stored on a tangible medium such as a flash memory, a read-only memory (ROM) and/or random-access memory (RAM) associated with a processor (e.g., the processor 1412 of FIG. 14). Alternatively, some or all of the example processes of FIGS. 10 and 11 can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 10 and 11 can be implemented manually or as any combination(s) of any of the foregoing techniques, for example, any combination of firmware, software, discrete logic and/or hardware. Further, although the example processes of FIGS. 10 and 11 are described with reference to the flow diagrams of FIGS. 10 and 11, other methods of implementing the processes of FIGS. 10 and 11 can be employed. For example, the order of execution of the blocks may be changed, and/or some of the blocks described may be changed, eliminated, sub-divided, or combined. Additionally, any or all of the example processes of FIGS. 10 and 11 can be performed sequentially and/or in parallel by, for example, separate processing threads, processors, devices, discrete logic, circuits, etc.

FIG. 10 is a flow diagram for an example method 1000 for identification of baseline and incremental sales volumes for one or more products. Using method 1000, for example, a historical sales volume is decomposed into an expected normal sales volume and an incremental sales volume attributable to short term marketing. At 1010, a time series of data is obtained. Data for sales of one or more products at one or more points of sale is obtained via cash register data, UPC scanning, and/or other monitoring or recording as discussed above. The data may be analyzed for accuracy, appropriateness, etc., and harmonized from various data sources, for example.

At 1020, time periods with promotions are identified. For example, weeks with promotional activities can be flagged. A time period can also be defined by days, months, etc. Promotional and/or other causal information can be obtained from a point of sale computer, personnel, and/or other information source including price cuts, discounts, sales, and/or other promotions at one or more points of sale in question.

At 1030, the data is aligned and harmonized on one or more dimensions, such as product, time, geography, etc. The data can be aligned, harmonized, and validated to fit a model based on one or more criteria or dimensions. For example, a product sales and promotion analysis can be conducted on an individual product level, a group/category level including a plurality of products, a competitor level comparing different brand products, etc. The sales data can be aligned according to a selected product level (e.g., an individual product identifier versus all diet cola identifiers) to facilitate proper model selection and analysis. Different locations and/or retailers may use different identifier numbers (e.g., UPCs) to identify the same product at different locations, and these difference can be harmonized and aligned, for example. Alternatively or in addition, retailer time period definitions can be aligned and harmonized such that variations in retailer definition of the time period (e.g., a week beginning Sunday versus a week beginning Monday) can be accounted for. Once the data has been aligned and harmonized in various dimensions, the quality and accuracy of the product sales data can be verified.

At 1040, time series data from promotional periods is ignored. That is, the causal data is correlated with the product sales data to identify product sales in the time series data that correspond to periods of promotional activity. Such data is ignored from the working set of product sales time series data being processed to determine expected base sales in subsequent passes of the data.

At 1050, the remaining time series data is processed according to a time series analysis. For example, multiple forward and backward passes through the available data are executed according to a Box-Jenkins time series model. A smoothing constant is applied to the data evaluation according to an exponentially smoothed moving average, for example.

At 1060, outlier values are ignored or discarded. For example, high (much greater than expected sales, e.g., the top 2%) and low (much less than expected sales, e.g., the bottom 2%) observations are removed from the time series model results. Use of the smoothing constant at 1050 places greater or lesser importance or weight on older sales data versus newer sales data to refine a more accurate baseline for expected base sales.

At 1070, time series analysis and removal of outlying data points is repeated in conjunction with the smoothing constant. As discussed above, the smoothing constant determines weight(s) given to older and/or new data points in the time series analysis. Double exponential smoothing over the product time series data absent sales from promotional periods provides a more accurate baseline for expected base sales of the one or more products at the one or more points of sale. However, depending upon one or more factors such as frequency of sales, single exponential smoothing may be sufficient to generate a baseline indicating expected base sales of a product (e.g., a good or service sold to a buyer, such as an individual consumer, a company, a government organization, etc.). In an example, single or double non-exponential rather than exponential smoothing can be applied to the data to apply weights in a non-exponential manner. Alternatively, non-weighted data smoothing can be applied to the data. A type of smoothing (e.g., exponential, non-exponential, weighted, non-weighted, etc.) can be determined based on one or more criteria such as data source, data quality, time period, etc.

At 1080, after the data has been exponentially smoothed, baseline information is generated. The baseline of expected base sales, excluding promotional effects, for the one or more products at the one or more point of sale locations can be output and/or stored as a fact or data for further use, for example. Baseline output can be displayed in graph (e.g., as shown in example FIGS. 6-8), chart, table, and/or other form for viewing by a user (e.g., a corporate executive or sales person), for example. Baseline output can be stored in electronic form for input into a computer program and/or system for further processing to generate predictions for product sales, promotional effects from a difference between the baseline and promotional event sales data, etc. The stored output data can be used for analysis, reporting, etc. The baseline and incremental sales can be used by an analytics engine and/or other system, apparatus, or process for further analysis, prediction, and/or decision-making based on the determined baseline and/or incremental sales data, for example.

In further detail, FIG. 11 illustrates a flow diagram for an example method 1100 for identification of baseline and incremental sales volumes for one or more products. At 1110, product sales data is obtained. For example, data for sales of one or more products at one or more points of sale is obtained via cash register data, UPC and/or other product identification code scanning, and/or other monitoring or recording as discussed above in conjunction with the central data processing server 102 and/or example promotion analysis engine 103 of FIGS. 1 and 2.

At 1120, causal data is obtained to identify weeks having one or more promotional events. For example, weeks with promotional activities can be flagged based on information from the promotion analysis engine 103. A time period can also be defined by days, months, etc. Promotional and/or other causal information can be obtained from a point of sale computer, personnel, and/or other information source including price cuts, discounts, sales, and/or other promotions at one or more points of sale in question.

At 1130, the causal data is integrated with the product sales data to remove or ignore product sales data values for the one or more promotional time periods (e.g., days, weeks, etc.). For example, promotional and/or other special events such as particular theme(s), price reduction(s), convoyed sales, etc., which presumably result in increased sales above the normal baseline, are ignored when processing the product sales data. The difference between actual sales and baseline sales represents incremental sales driven by promotion.

The remaining non-promotional product sales data is exponentially smoothed to determine expected base sales for the product. While traditionally a time series analysis such as a Box-Jenkins analysis is applied to all data in a time series, here only non-promoted sales data is used in the time series analysis. For example, a time series analysis, such as a Box-Jenkins (or modified Box-Jenkins) ARMA or ARIMA time series analysis, is applied to expectations of non-promoted sales volume calculated at a time period (e.g., day or week), product, and/or location level. A smoothing constant is applied to the data evaluation according to an exponentially smoothed moving average, for example. Exponential smoothing according to a time series model is discussed in further detail at 1140-1170 below.

At 1140, a forward pass is executed at the baseline using the non-promoted product sales data. For example, as discussed above, a statistical model is applied to the non-promoted product sales data from oldest to newest. At 1150, a backward pass is executed at the baseline using the non-promoted product sales data. For example, as discussed above, a statistical model is applied to the non-promoted product sales data from newest to oldest. At 1160, the forward and backward passes are averaged. Thus, a statistical model or representation of the non-promoted product sales data can be determined from the forward and backward passes.

At 1170, short and long sales are calculated. Short and long sales calculations can be variance-based, parameter-based (e.g., based on a particular country's data), etc., and represent outlier sales data that exceeds an acceptable range for processing according to a defined variance, parameter, etc. Short and long sales provide valuable insight because they can each be treated as unidentified causal data or conditions. For example, if the sales data includes a spike in sales that is much larger than average but no particular causal data has been capture, the long sale may represent another causal factor that was not otherwise captured. At 1180, the outlying values are excluded. Thus, for an expected baseline determination, extreme or outlier values (e.g., the identified short and long sales values, such as the lowest and highest two percent) on either end of the product sales range can be ignored or discarded to focus on a more cohesive grouping of expected base data.

At 1190, if the process is to be repeated, the forward and backward passes are re-executed at 1140-1150, and the two passes are averaged at 1160. By repeating the multi-pass and average process, a baseline can be determined with a higher degree of accuracy wherein an effect of anomalous values is reduced.

At 1195, expected base facts are reported using an exponentially smoothed model. As discussed above, the smoothing constant determines weight(s) given to older and/or new data points in the time series analysis. Double exponential smoothing over the product time series data absent sales from promotional periods provides a more accurate baseline for expected base sales of the one or more products at the one or more points of sale. However, single exponential smoothing can be used as well. For example, if product sales data exhibits a trend as well as seasonal effects, then double exponential smoothing may be appropriate. However, if the product sales data exhibits a trend but no seasonal effects, then single exponential smoothing may be sufficient. Other smoothing techniques such as weighted non-exponential, non-weighted non-exponential, etc., can be applied to the data instead of or in addition to the double or single exponential smoothing described above. The baseline of expected base sales, excluding promotional effects, for the one or more products at the one or more point of sale locations can be output and/or stored for further use, for example. Baseline output can be displayed in graph (such as the example graphs of FIGS. 6-8), chart, table, and/or other form for viewing by a user (e.g., a corporate executive or sales person), for example. Baseline output can be stored in electronic form for input into a computer program and/or system for further processing to generate predictions for product sales, promotional effects from a difference between the baseline and promotional event sales data, etc.

The process 1100 described above can be applied to a baseline initiation sequence followed by at least one baseline update sequence when new data becomes available. Expected base sales information for one or more products at one or more points of sale can be updated and reported (and/or otherwise output) as new data becomes available. Based on the smoothing factor and/or other weight, older data can be less emphasized as new data becomes available, for example.

FIG. 12 illustrates an example baseline process system 1200 generating a model for time series sales data and providing a baseline using the model and the time series sales data. The system 1200 includes point of sale data input 1210, causal data input 1220, a data preparation and alignment module or engine 1230, a modeling module or engine 1240, and a baseline output 1250. Any or all of the components of the system 1200 can be implemented in software, hardware, and/or firmware separately and/or in any number of combinations. For example, one or more integrated circuits, discrete semiconductor components, and/or passive electronic components can be used. Thus, for example, any of the components of system 1200, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. Some or all of the system 1200, or parts thereof, can be implemented using instructions, code, and/or other software and/or firmware, etc. stored on a machine accessible or readable medium and executable by, for example, a processor system (e.g., the example processor system 1410 of FIG. 14). When any of the appended claims are read to cover a purely software and/or firmware implementation, at least one of the point of sale data input 1210, causal data input 1220, a data preparation and alignment module 1230, modeling module 1240, and baseline output 1250 is hereby expressly defined to include a tangible medium such as a memory, DVD, CD, etc. storing the software and/or firmware.

Point of sale (POS) data is obtained at the POS data input 1210. POS data can be obtained for one or more products from one or more locations such as discussed above with respect to FIG. 1. Similarly, causal data is obtained at the causal data input 1220 to identify one or more promotions, special events, etc., at one or more locations for one or more products in the POS data input. POS data input 1210 and causal data input 1220 are transferred to the data preparation and alignment module 1230 for processing.

Figure 8:
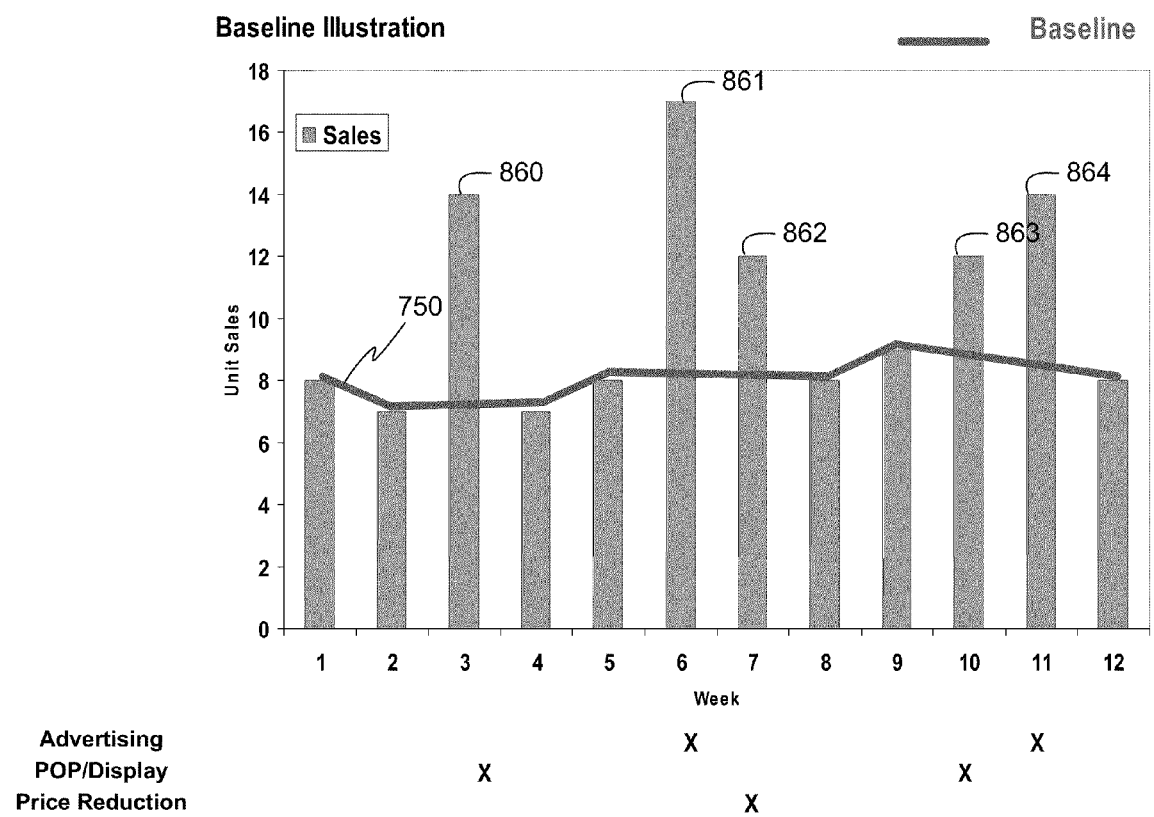
FIG. 8 illustrates an example graph representative of total product sales data including both base sales and incremental sales in conjunction with causal data.

The data preparation and alignment module 1230 correlates and aligns the POS data with the causal data as shown in the graphs of FIGS. 6-8. Data is processed such that the POS input data and the causal data can be correlated and used in a time series analysis in conjunction with one or more models and equations, such as the models and equations described above. Data can be prepared and aligned along one or more dimensions including, product, time, geography, etc. For example, the module 1230 can align individual products or product families. For example, the module 1230 can focus on a particular store, a geographic region of stores, a retail chain of stores, etc. For example, the module 1230 can prepare and align the data for a time period of a month, a day, a week, etc. Alignment and preparation of the received POS data helps determine which model is selected for processing and how well the model fits the POS data. Using the causal data, the POS data can be reduced to eliminate data from weeks having a promotional and/or other special event. Once the data is harmonized and aligned, the data is packaged and sent to the modeling module 1240.

As discussed above, the data preparation and alignment module 1230 processes received POS data, causal data, and classification information to characterize the data and determine the context of the data and the fitness of the data for analysis. To align the data based on geography or location information management (LIM), point of sale (e.g., store) identifier, location (e.g., latitude/longitude, street address), physical characteristics (e.g., store size, presence of a drive-through, etc.), market, store grouping, etc., can be analyzed with respect to the received POS data. For example, the module 1230 can help determine a relevant geographic area within which to analyze the sales (e.g., sister stores in a town, in a region, in a state, in a certain type of community, etc.). For example, while bug spray may sell in Texas in March, the same product may not sell in Minnesota until June. Data and characteristics are aligned in order to calibrate and adjust a model to be applied to the data.

Another dimension for data preparation and alignment is the time dimension. For example, if Retailer 1 at Store 1 operates and provides data on a week going from Monday through Sunday, while Retailer 2 at Store 1 operates and provides data on a week going from Saturday to Saturday to define a business week, causal alignment problem results. Contributing points of sale data are aligned to a common time standard, such as a day or week. Time zone may also be considered when aligning time information and POS data, for example.

Another dimension for data preparation and alignment is the product dimension. For example, if there are multiple data contributors, a definition of a product should be aligned for analysis. The data preparation and alignment module 120 determine a level of product granularity that matters to the particular business. If the product granularity level is on an item basis, then an alignment problem may exist across retail organizations due to different UPCs for the same product, for example. Product alignment can become more complicated by crossing markets or countries, for example. A product hierarchy determination can drive a modeling level. For example, an individual SKU can be modeled versus creating a pseudo-UPC representing 15 SKUs for the same product.

Each of the dimensions or classification characteristics, such as geography, time, and product, can impact modeling of the POS sales data. Classification information is analyzed and then used to align and harmonize the data.

After the data is analyzed in its multiple dimensions, the product sales data is checked to determine data legitimacy as a sales measure. For example, a point of sale may show 12 units distribute, but two of those units were given away, so only 10 of the units count as sales. For example, a point of sale may have sold 10 units but had 2 returns, so only 8 units count as sales for analysis.

After the available data is understood, then variance of the time series is determined. Variance in data series typically has two sources: natural variance in the data based on what is measured and artifacts of collection and processing, for example. Using a recursive approach to data quality, the module 1230 facilitates correction of artifact data at its source, automated corrected with data cleansing/editing routines, and/or ignoring of artifact-related observations. The natural variance in the time series feeds the model design. Once artifacts in the data are remedied, the module 1230 returns to an analysis of natural variance in the data to feed the model. Natural variance information in the POS data can be provided for model testing, as discussed below.

Following artifact compensation and natural variance determination, the data is aligned and harmonize so that the correct causal data is being applied to the sales data. Following data harmonization and alignment, modeling can begin. The aligned and harmonized data and dimension information form master data managed for further modeling and analysis of the POS data in a time series. The master data can be updated as needed or desired to maintain data alignment, harmonization, and data quality.

The modeling module 1240 selects a model corresponding to the data received from the preparation and alignment module 1230. For example, an ARMA or ARIMA model can be selected, such as an exponentially smoothed moving average model, to be applied to the data. Other smoothing techniques such as weighted non-exponential, non-weighted non-exponential, etc., can be applied to the data instead of or in addition to double or single exponential smoothing.

A model can be selected and tested by first identifying a level of aggregation, periodicity, and differencing for the data. For example, when selecting and fitting a model, a level of aggregation is determined for the model. For example, natural variance and sales velocity are determined for the sales data to determine whether a level of aggregation should be at an item-store-day level, an aggregated item level (e.g., rolling up several similar model numbers into one item), an aggregated store level (e.g., combining item sales across several stores), etc. A period or interval can be determined based on sales frequency or velocity. For example, a product having frequent sales may be analyzed according to a period of days whereas a less frequently sold product may be analyzed according to a period of weeks or months.

Furthermore, trends and/or seasonality are identified in the data using a model. If both trend and seasonality are identified in the data, double exponential smoothing can be applied to the data. If only trend is identified in the data, single exponential smoothing can be applied to the data. Standard statistical methodologies can be applied to determine a fit for the model to the data based on forecaster or estimated data values compared to actual values (e.g., using a mean-squared error, etc.).

A smoothing factor and/or other weight is selected and tested with the data to determine appropriateness for the particular data set. For example, a smoothing/weighting factor to be used for food item data may be different from a smoothing/weighting factor to be used for appliance item data. For example, POS data for a food item with a high frequency of sales may be processed and analysis differently than POS data for an appliance with a low frequency of sales. The model and associated algorithms can be adjusted based on one or more factors such as sales frequency, cross-sectional effects, etc. Causal data, outlier rules, and/or other parameter values can be determined and tested for a fit with the model.

Cross-sectional adjustments can include a market level adjustment factor to reach across markets to bring in outside market-level variables that may be impacting a baseline for a particular period (e.g., a strike, a holiday, promoted in some stores vs. non-promoted in other stores and want to see the additional market effect on sales without the promotion). Cross-sectional adjustment factors can include expanding point of sale/product geography (e.g., the location dimension), pool of UPCs/SKUs/product codes (e.g., the product dimension), adjusting the period from weekly down to daily and vice versus (e.g., the time dimension), etc.

Price reductions can also be analyzed to determine what level of a price reduction should qualify as a promotion versus simply a price change for the product. A short-term price cut can be differentiated from a long-term price cut (e.g., when does it become the regular price—after 2 weeks, 6 weeks, etc.) Price cut percentage and length of time can be used to determine a price reduction versus price change threshold.

Additionally, the system and model cope or compensate when misaligned causal data occurs. For example, if the infrastructure of a retailer's POS data is done from Saturday to Saturday but they promote things mid-week to mid-week, the promotional pattern does not follow the data pattern. Therefore, both weeks of sales are credited with the promotion, for example.

To determine smoothing parameters and the form of the model (e.g., use of double versus single smoothing), grid searches of the data can be performed to reduce or minimize fit and mean-squared error for all non-promoted items. Model fit diagnostics can be performed, and the model testing and fit process can be repeated until the error is within a certain acceptable limit indicating model fitness for the data series.

Data alignment and model fitting may occur at initialization and upon update and/or resynchronization as determined by one or more criterion such as manual user trigger, a certain change in data, time passage, etc. Otherwise, once the data is aligned and the model is determined, data processing can proceed with multiple data processing passes and smoothing. As discussed above with respect to FIGS. 9-11, forward and backward passes through the data are performed with exponential smoothing and elimination of outlier values to determine a baseline result.

Once the model and associated algorithm(s) are satisfactory, the baseline data output 1250 is generated for the time series of POS data. The POS data is processed to remove promotional periods, remove outlying values, and conduct multiple forward and backward passes through the data according to the model, for example. The resulting data is smoothing (e.g., double or single exponential smoothing) to provide an accurate, efficient baseline output 1250 for a user.

The output 1250 can include one or more presentations of baseline data including a graph, chart, table, database, spreadsheet, input file and/or parameter(s) for another program, etc. The output 1250 can also include incremental sales information stemming from a comparison of the baseline data with the data from the promotional time periods indicated in the causal data, for example. The output data 1250 can be displayed and/or otherwise presented for review and/or use by software and/or hardware, for example. The output data 1250 can also be stored for later presentation and/or other use.

In more example detail, FIG. 13 illustrates an example baseline process system 1300 generating a model for time series sales data and providing a baseline using the model and the time series sales data. Any or all of the components of the system 1300 shown in FIG. 13 can be implemented in software, hardware, and/or firmware separately and/or in a variety of combinations, for example. For example, one or more integrated circuits, discrete semiconductor components, and/or passive electronic components can be used. Thus, for example, any of the components of system 1200, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. Some or all of the system 1300, or parts thereof, can be implemented using instructions, code, and/or other software and/or firmware, etc. stored on a machine accessible or readable medium and executable by, for example, a processor system (e.g., the example processor system 1410 of FIG. 14). When any of the appended claims are read to cover a purely software and/or firmware implementation, at least one of the point of sale data input 1305, causal data input 1315, data acquisition and cleansing process 1310, POS data profiling process 1320, causal data profiling process 1325, POS master data management build out 1330 causal master data management build out 1335, data preparation and alignment process 1340, aligned profile across historical data 1345, data alignment and harmonization build out 1350, model and algorithm testing and fit process 1355, model validation process 1360, algorithm build out 1365, and analytical baseline fact output 1370 is hereby expressly defined to include a tangible medium such as a memory, DVD, CD, etc. storing the software and/or firmware.

As shown, for example, in FIG. 13, point of sale (POS) data input 1305 is provided to a data acquisition and cleansing process 1310. Additionally, causal data input 1315 is provided to the data acquisition and cleansing process 1310. As discussed above, the data acquisition and cleansing process 1310 obtains the POS data input 1305 and causal data input 1315 for one or more products from one or more locations such as via the system of FIG. 1. The POS data input 1305 identifies sales for one or more products at one or more locations. The causal data input 1315 identifies one or more promotions, special events, etc., at one or more locations for one or more products in the POS data input 1305. The data acquisition and cleansing process 1310 cleanses or prepares the data 1305, 1315 for processing and use in the system 1300.

The POS data input 1305 is provided to a POS data profiling process 1320. Similarly, the causal data input 1315 is provided to a causal data profiling process 1325. The data profiling processes 1320, 1325 process the input data 1305, 1315 to organize the data into a time series and prepare the data for further processing. The data profiling processes 1320, 1325 look at data ranges, variability, etc., and try to identify patterns in the data. The data profiling processes 1320, 1325 determine the form of the model and try to fit a model to the data. Once the data 1305, 1315 has been profiled at 1320, 1325, the profiled POS data is passed to a POS/product master data management (MDM) build out module 1330, and the profiled causal data is passed to a causal MDM build out module 1335.

The MDM build out modules 1330, 1335 prepare the profiled data for use with one or more models and associated algorithms, for example. The MDM build out modules 1330, 1335 include processes and tools that collect, aggregate, match, and/or consolidate the POS and causal data, respectively, to help provide consistency and control of the data for other components of the system 1300. The MDM modules 1330, 1335 help ensure that multiple, potentially inconsistent versions of data are not propagated to other components of the system 1300 and help provide quality-assurance for the profiled input data 1305, 1315. Once master data has been determined, the master data can be reused for analysis in the time series until re-initialization and/or other recalibration of data alignment and modeling, for example.

The POS data profiling process 1320, the causal data profiling process 1325, the POS MDM build out 1330, and the causal MDM build out 1335 all output to a data preparation and alignment process 1340. The data preparation and alignment process 1340 correlates and aligns the POS data with the causal data as shown in the graphs of FIGS. 6-8. Data is processed such that the POS data input 1305 and the causal data input 1315 can be correlated and used in a time series analysis in conjunction with one or more models and equations, such as the models and equations described above. Using the causal data, the POS data can be reduced to eliminate data from weeks (or days and/or other time period) having a promotional and/or other special event.

Output from the data preparation and alignment process 1340 generates an aligned profile across historical data 1345 as well as a data alignment and harmonization build out 1350. The aligned profile across historical data 1345 also provides input to the data alignment and harmonization build out 1350. Further, the aligned profile 1345 generates input for a model and algorithm testing and fit process 1355.

The model and algorithm testing and fit process 1355 iterates with a model validation process 1360 to test and validate a POS baseline algorithm. The model and algorithm testing and fit process 1355 selects a model corresponding to the profile aligned across historical data 1345. For example, an ARMA or ARIMA model can be selected, such as an exponentially smoothed moving average model, to be applied to the data. A smoothing factor and/or other weight is selected and tested with the data to determine appropriateness for the particular data set. For example, a smoothing/weighting factor to be used for food product data may be different from a smoothing/weighting factor to be used for appliance product data. Other smoothing techniques such as weighted non-exponential, non-weighted non-exponential, etc., can be applied to the data instead of or in addition to double or single exponential smoothing. The model and associated data analysis algorithm(s) can accommodate different blends of parameters to accommodate different speeds or frequencies of sales, quantities, etc. Using the POS data and other applicable parameters and/or constraints, the model and associated algorithm(s) can be more accurately selected and configured. As discussed above with respect to FIGS. 9-12, forward and backward passes through the data are performed with exponential smoothing and elimination of outlier values to determine a baseline result.

After validating the model and associated algorithm(s) at 1360, the time series data analysis algorithm is transmitted for algorithm build out 1365. Model testing, validation, and build out may occur at initialization and recalibration of the system 1300 rather than during every time series data analysis, for example. After initialization or recalibration, the determined model and master data from MDM can be reused with the time series POS data until a recalibration and/or other such event occurs.

Following algorithm build out 1365, analytical baseline fact outputs 1370 are provided for the time series of POS data. The output 1370 can include one or more presentations of baseline data including a graph, chart, table, database, spreadsheet, input file and/or parameter(s) for another program, etc. The output 1370 can also include incremental sales information stemming from a comparison to of the baseline data with the data from the promotional time periods indicated in the causal data, for example. The output data 1370 can be displayed and/or otherwise presented for review and/or use by software and/or hardware, for example. The output data 1370 can also be stored for later presentation and/or other use.

FIG. 14 is a block diagram of an example processor system that may be used to implement some or all of the example methods and apparatus described herein. As shown in FIG. 14, the processor system 1410 includes a processor 1412 that is coupled to an interconnection bus 1414. The processor 1412 includes a register set or register space 1416, which is depicted in FIG. 14 as being entirely on-chip, but which could alternatively be located entirely or partially off-chip and directly coupled to the processor 1412 via dedicated electrical connections and/or via the interconnection bus 1414. The processor 1412 may be any suitable processor, processing unit or microprocessor. Although not shown in FIG. 14, the system 1410 may be a multi-processor system and, thus, may include one or more additional processors that are identical or similar to the processor 1412 and that are communicatively coupled to the interconnection bus 1414.

The processor 1412 of FIG. 14 is coupled to a chipset 1418, which includes a memory controller 1420 and an input/output (I/O) controller 1422. As is well known, a chipset typically provides I/O and memory management functions as well as a plurality of general purpose and/or special purpose registers, timers, etc. that are accessible or used by one or more processors coupled to the chipset 1418. The memory controller 1420 performs functions that enable the processor 1412 (or processors if there are multiple processors) to access a system memory 1424 and a mass storage memory 1425.

The system memory 1424 may include any desired type of volatile and/or non-volatile memory such as, for example, static random access memory (SRAM), dynamic random access memory (DRAM), flash memory, read-only memory (ROM), etc. The mass storage memory 1425 may include any desired type of mass storage device including hard disk drives, optical drives, tape storage devices, etc.

The I/O controller 1422 performs functions that enable the processor 1412 to communicate with peripheral input/output (I/O) devices 1426 and 1428 and a network interface 1430 via an I/O bus 1432. The I/O devices 1426 and 1428 may be any desired type of I/O device such as, for example, a keyboard, a video display or monitor, a mouse, etc. The network interface 1430 may be, for example, an Ethernet device, an asynchronous transfer mode (ATM) device, an 802.11 device, a DSL modem, a cable modem, a cellular modem, etc. that enables the processor system 1410 to communicate with another processor system.

While the memory controller 1420 and the I/O controller 1422 are depicted in FIG. 14 as separate functional blocks within the chipset 1418, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A computer-implemented process for determining expected base sales for a sold product, comprising:
   obtaining sales data for a product sold at a point of sale location, the sales data organized in a time series according to a time period;
   obtaining causal data identifying a promotional event for at least one of the product and the point of sale location;
   excluding sales data corresponding to the promotional event to determine a time series of non-promoted sales data for the product;
   processing, using a processor, the non-promoted sales data using a double exponentially smoothed moving average model including a smoothing constant that assigns exponentially decreasing weights to older sales data values as the sales data becomes older in time, the processing comprising:
      executing a preliminary backward pass through the remaining sales data;
      executing a preliminary forward pass through the remaining sales data;
      averaging the preliminary backward pass and the preliminary forward pass;
      updating the remaining sales data for the product based on second sales data for an additional time period received for the product to provide updated sales data for the product;
      executing an updated backward pass through the updated sales data;
      executing an updated forward pass through the updated sales data; and
      averaging the updated backward pass and the forward pass;
   generating, using the processor, expected base data for the product based on the double exponentially smoothed moving average model; and
   outputting the expected base data for the product to a user.

2. A process according to claim 1, further comprising comparing the expected base sales for the product to sales data corresponding to the promotional event to determine incremental sales for the product.

3. A process according to claim 1, further comprising calculating short and long sales from the remaining sales data based on the averaged backward and forward passes and ignoring outlying short and long sales data points in the time series in the plurality of passes through the remaining sales data.

4. A process according to claim 1, wherein processing the remaining sales data using the double exponentially smoothed moving average model comprises employing a smoothing constant to provide relative higher weight to newer sales data and relative lower weight to older sales data.

5. A process according to claim 4, wherein the double exponentially smoothed moving average model comprises an exponentially smoothed moving average model wherein the smoothing constant assigns exponentially decreasing weights as the sales data becomes older in time.

6. A process according to claim 1, wherein the double exponentially smoothed moving average model is selected based on a determination of trend and seasonality in time series data.

7. A process according to claim 1, wherein outputting the expected base data for the product to a user further comprises at least one of generating a visual depiction of the expected base data for display to the user and generating a machine-readable representation of the expected base data for further processing.

8. A tangible computer readable storage medium including a program which, when executed, causes a machine to implement a process for determining expected base sales for a sold product, comprising:
   obtaining sales data for a product sold at a point of sale location, the sales data organized in a time series according to a time period;
   obtaining causal data identifying a promotional event for at least one of the product and the point of sale location;
   excluding sales data corresponding to the promotional event to determine a time series of non-promoted sales data for the product;
   processing the non-promoted sales data using a double exponentially smoothed moving average model including a smoothing constant that assigns exponentially decreasing weights to older sales data values as the sales data becomes older in time, the processing comprising:
      executing a preliminary backward pass through the remaining sales data;
      executing a preliminary forward pass through the remaining sales data;
      averaging the preliminary backward pass and the preliminary forward pass;
      updating the remaining sales data for the product based on second sales data for an additional time period received for the product to provide updated sales data for the product;
      executing an updated backward pass through the updated sales data;
      executing an updated forward pass through the updated sales data; and
      averaging the updated backward pass and the forward pass; and
   generating expected base data for the product based on the double exponentially smoothed moving average model.

9. A computer readable storage medium according to claim 8, wherein the process further comprise comparing the expected base sales for the product to sales data corresponding to the promotional event to determine incremental sales for the product.

10. A computer readable storage medium according to claim 8, wherein the process further comprises calculating short and long sales from the remaining sales data based on the averaged backward and forward passes and ignoring outlying short and long sales data points in the time series in the plurality of passes through the remaining sales data.

11. A computer readable storage medium according to claim 8, wherein processing the remaining sales data using the double exponentially smoothed moving average model comprises employing a smoothing constant to provide relative higher weight to newer sales data and relative lower weight to older sales data.

12. A computer readable storage medium according to claim 11, wherein the double exponentially smoothed moving average model comprises an exponentially smoothed moving average model wherein the smoothing constant assigns exponentially decreasing weights as the sales data becomes older in time.

13. A computer readable storage medium according to claim 8, wherein the double exponentially smoothed moving average model is selected based on a determination of trend and seasonality in time series data.

14. A computer readable storage medium according to claim 8, wherein the process further comprises outputting the expected base data for the product to a user by at least one of generating a visual depiction of the expected base data for display to the user and generating a machine-readable representation of the expected base data for further processing.

* * * * *

UNITED STATES PATENT AND TRADEMARK OFFICE
CERTIFICATE OF CORRECTION

| | |
|---|---|
| PATENT NO. | : 8,265,989 B2 |
| APPLICATION NO. | : 12/435874 |
| DATED | : September 11, 2012 |
| INVENTOR(S) | : Dodge et al. |

It is certified that error appears in the above-identified patent and that said Letters Patent is hereby corrected as shown below:

In the Drawings

Delete Drawing Sheets 4, 5, and 10 and substitute therefore with the attached Drawing Sheets 4, 5, and 10 consisting of corrected FIGS. 4, 5, and 10.

Signed and Sealed this
Sixth Day of May, 2014

Michelle K. Lee
*Deputy Director of the United States Patent and Trademark Office*